United States Patent
Giurca et al.

(10) Patent No.: US 11,472,545 B2
(45) Date of Patent: Oct. 18, 2022

(54) PROPULSION SYSTEM AND AIRCRAFT WITH VERTICAL TAKE-OFF AND LANDING-VTOL

(71) Applicants: Liviu Grigorian Giurca, Craiova (RO); Michael Silviu Soimar, Norton Shores, MI (US)

(72) Inventors: Liviu Grigorian Giurca, Craiova (RO); Michael Silviu Soimar, Norton Shores, MI (US)

( * ) Notice: Subject to any disclaimer, the term of this patent is extended or adjusted under 35 U.S.C. 154(b) by 176 days.

(21) Appl. No.: 16/791,100

(22) Filed: Apr. 21, 2020

(65) Prior Publication Data
US 2021/0323662 A1 Oct. 21, 2021

(51) Int. Cl.
*B64C 39/08* (2006.01)
*B64C 39/06* (2006.01)
*B64C 29/00* (2006.01)
*B64C 27/26* (2006.01)
*B64C 27/08* (2006.01)

(52) U.S. Cl.
CPC ...... *B64C 29/0025* (2013.01); *B64C 29/0091* (2013.01); *B64C 39/08* (2013.01); *B64C 27/08* (2013.01); *B64C 27/26* (2013.01)

(58) Field of Classification Search
CPC ..... B64C 29/0091; B64C 39/08; B64C 27/08; B64C 39/068; B64C 29/0025
See application file for complete search history.

(56) References Cited

U.S. PATENT DOCUMENTS

| | | | | |
|---|---|---|---|---|
| 1,495,031 A | * | 5/1924 | Muzik | B64C 39/08 244/45 R |
| 2,406,625 A | * | 8/1946 | Oglesby | B64D 27/02 244/45 R |
| 2,937,823 A | * | 5/1960 | Fletcher | B64C 29/0033 244/12.6 |
| 3,350,035 A | | 10/1967 | Schlieben | |

(Continued)

FOREIGN PATENT DOCUMENTS

| | | |
|---|---|---|
| DE | 102019121788 A1 * | 2/2021 |
| FR | 416322 A * | 10/1910 |
| WO | 2019/090999 A1 | 5/2019 |

*Primary Examiner* — Brian M O'Hara

(57) ABSTRACT

The present invention relates to the propulsion system and aircraft with vertical take-off and landing—VTOL that uses aerodynamic phenomena of thrust amplification, including at zero speed, to reduce the thrust/weight ratio.

According to the invention, an individual aircraft 1, with vertical take-off and landing, uses a fuselage 2 in the form of a frame 3 that merges two propulsion system, 4 and 5 one in the front and the other in the rear, of the bi-planar type, located at the ends of the fuselage 2. The propulsion system 4 uses two wings 6 and 7, which are superimposed, parallel and distanced by a certain distance D. The rear wing 7 is fixed perpendicularly to the frame 3 in its median area, so that an angle α between 25° and 80° is formed with the horizontal plane in static position. The front wing 6 and the rear wing 7 are secured at their ends by two jet limiters 8. Similarly the rear propulsion system 5 uses two wings 8 and 10. On each rear wing 7 and 10 are installed a number of electric motors 11, preferably located at equal distances from each other. Each electric motor 11 actuates a tractor propeller 12.

22 Claims, 22 Drawing Sheets

(56) References Cited

U.S. PATENT DOCUMENTS

| | | | | |
|---|---|---|---|---|
| 3,614,033 A | * | 10/1971 | McCarty, Jr. | B64C 39/12 |
| | | | | 40/212 |
| 8,733,690 B2 | | 5/2014 | Bevirt | |
| 9,346,542 B2 | * | 5/2016 | Leng | B64C 27/26 |
| 10,011,351 B2 | | 7/2018 | McCullough | |
| 10,336,450 B2 | * | 7/2019 | Graham | G05D 1/0858 |
| 10,597,152 B2 | * | 3/2020 | Groninga | B64C 39/008 |
| 2020/0317332 A1 | * | 10/2020 | Didey | B64C 39/08 |

* cited by examiner

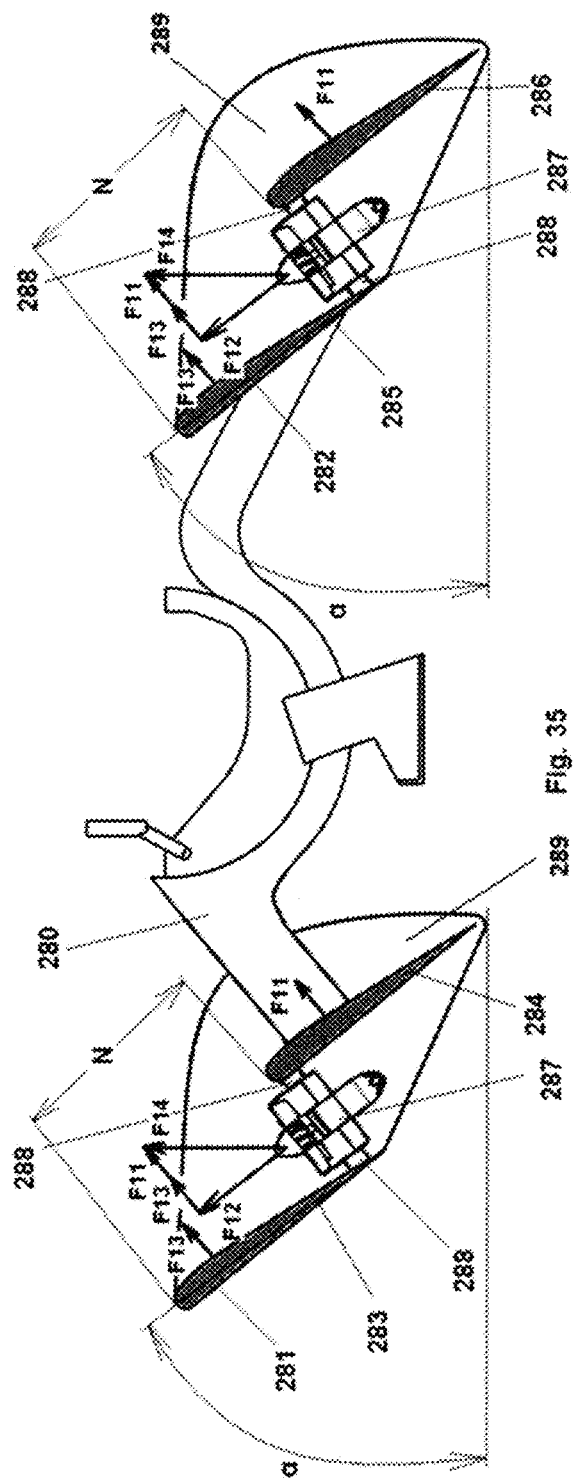

PROPULSION SYSTEM AND AIRCRAFT WITH VERTICAL TAKE-OFF AND LANDING-VTOL

TECHNICAL FIELD

The present invention refers to a propulsion system and aircraft with vertical take-off and landing—VTOL that use aerodynamic phenomena of thrust amplification, including at zero aircraft speed, to reduce the thrust/weight ratio.

BACKGROUND

Aircraft with vertical take-off and landing capability (VTOL) combine the benefits of helicopters, i.e. take-off and landing on limited space or hard-to-reach land, with the advantages of conventional aircraft, such as increased cruise speed and best forward flight efficiency.

Most VTOL aircraft solutions use separate propulsion systems for horizontal and vertical flight, which complicates the construction, increases the weight of the aircraft and presents a high cost.

Also, the majority of VTOL aircraft solutions use distributed electric propulsion (DEP) without using additional aerodynamic phenomena to reduce the thrust/weight ratio, which in most cases is supra unitary (1.2-1.4).

It is known the solution described in U.S. Pat. No. 9,346,542 (B2) for an individual aircraft. Although this is a simple solution, it has the disadvantage of a big thrust/weight ratio because it does not use any additional device to amplify the thrust. Due to the fact that the pilot's position during take-off and landing is face up, the visibility is very poor and the comfort of the pilot is diminished. This solution is not scalable and the propellers are not protected, creating danger for the environment and for the people on the ground.

It is known the solution described in the U.S. Pat. No. 3,350,035 (A), U.S. Ser. No. 10/011,351 (B2) and U.S. Pat. No. 8,733,690 (B2) where a pivoting cabin is used. For these solutions the access of passengers inside is difficult having the pivoting mechanism on the sides of the cabin, where normally should be the doors. Also, in these cases the thrust/weight ratio is not favorable, the solutions being very complicated. For some of them, the completely open propellers can have contact with the outside environment or with people around.

It is know the solution of the VTOL aircraft with semi-circular or channel wings described in the U.S. Pat. No. 2,937,823 (A) and WO 20190900999 (A1). In these cases, the channel wings are tilted to achieve the forward flight. The tilting mechanisms of the wings are complex and heavy, reducing the redundancy level and affecting negatively the aircraft performances.

As a consequence, it becomes a necessity to create a very efficient propulsion system, with reduced thrust/weight ratio, that can be used for both vertical and horizontal flight, whose drive is very simple and at which the transition from vertical to forward flight and vice versa is quickly made.

On the other hand, there is a need to have an aircraft configuration that avoids the contact of the moving parts, respectively of the propellers, with the external environment or with people on the ground.

OBJECTIVES

The main objective of the invention is to create a propulsion system that can obtain a total lift force greater than the thrust force developed by the rotors.

The second objective of the invention is to define a new architecture of a propulsion system and an aircraft with vertical take-off and landing that uses a single type of propulsion system for both horizontal and vertical flight and which produces lift even in static conditions.

Another objective of the invention is to reduce the weight of the embarked power sources.

Another objective of the invention is to achieve an aircraft with simplified construction, without actuators for wings, propellers or flaps, but which is fully operational.

Another objective of the invention is to offer a comfortable position to the pilot and to the passengers, with good visibility and easy access.

Another objective of the invention is to protect the aircraft against the contact with the environment limits.

Another objective of the invention is to avoid the contact of the propellers with the people on the ground.

Another objective of the invention is to increase the efficiency and the speed of the aircraft in forward flight.

Another objective of the invention is to use a propulsion system with easy propeller deactivation in order to reduce the energy consumption during the forward flight.

Another objective of the invention is to offer a high redundancy level, without single points of failure that can conduct to a catastrophic event and can affect passenger and payload safety.

SUMMARY

Conforming with the disclosure, in a first embodiment, according to a first aspect of the invention, an aircraft uses a propulsion system composed of a fuselage in the form of a frame that merges two propulsion units, one in the front and one in the back, located at the ends of the fuselage. Each propulsion unit is of biplane type. Each biplane propulsion unit uses a front wing and a rear wing that are parallel and spaced within a certain distance. The front and rear wings are fixed perpendicular to the frame in their median area, so that the angle formed with the horizontal plane in the static position (on take-off and landing) is between 25° and 80°. According to another aspect of the invention on each rear wing a number of electrical motors are mounted on its leading edge, preferably positioned at equal distances from each other. Each electric motor operates a tractor propeller, which can have fixed or variable pitch. The rotational plan of the tractor propeller is in the vicinity of the trailing edge of the front wing.

In accordance with another aspect of the invention, a tilting pilot seat can rotate on the bearing located on the frame.

In accordance with another aspect of the invention a rotating cabin is attached in the median area of the frame, which can rotate on a central bearing located in the center of gravity zone of the cabin.

According to another aspect of the invention the pilot seat or the cabin are rotated with the help of an actuator that acts, by means of a pinion, a toothed sector integrated with the seat or with the cabin. The actuator is controlled by a controller based on information from a group of sensors including a seat or cabin position sensor that perceives the position as compared to the fuselage, a gyroscopic platform that perceives the position of the seat or of the cabin in space, and a speed sensor which indicates the speed of the aircraft on forward flight. The controller is connected to an electronic control unit that regulates the stability of the aircraft, controlling the aircraft direction and correlating with the aircraft speed.

According to another aspect of the invention the cabin uses two lateral floaters for landing on water as those used the amphibious aircraft.

According to another aspect of the invention, one method of producing vertical lift for each biplane propulsion unit is to use the rear wing as a blown wing when the electric motors operate the tractor propellers. At the same time, the tractor propellers produce a significant suction on the upper surface of the front wing which contributes to the increase of the vertical thrust force.

According to another aspect of the invention, a method of controlling the passage from vertical to forward flight and vice versa is achieved by varying the rotational speed of the tractor propellers located at the rear versus the speed of the tractor propellers located at the front, which causes the peach angle change.

In accordance with another aspect of the invention, a method of controlling the position of the seat or of the cabin is achieved by the actuator that keeps the seat/cabin in the same comfortable position for different pitch angles of the aircraft.

According to another aspect of the invention, a fuselage in the form of a frame that merges two propulsion units, one in the front and other back, of the biplane type, located at of the both ends of the fuselage. Each biplane propulsion unit uses a front wing and a rear wing that are parallel and spaced with a certain distance. The front and rear wings are fixed perpendicular to the frame in their median area, so that the angle formed with the horizontal plane in the static position (in take-off and landing) is between 25° and 80°. According to another aspect of the invention, on the front wing are mounted using brackets a number of electric motors, preferably located at equal distances from each other. Each electric motor operates a pusher propeller, which has foldable blades.

According to another aspect of the invention, one method of producing vertical lift for each biplane propulsion unit is to create an increased pressure the rear wing in the area of its lower surface when the electric motors operate the pusher propellers. At the same time, the pusher propellers produce a significant depression on the upper surface of the front wing which contributes to the increase of the vertical thrust force. At cruising speed some of the electric motors can be deactivated and the corresponding pusher propellers align their blades along the electric motor axis, reducing the drag.

According to another aspect of the invention a number of ducted fans can be used instead of the propellers. The ducted fans are supported by brackets mounted between the front and rear wings.

The biplane propulsion unit has a high efficiency because it uses the depression on the upper surface and the increased pressure on the lower surface of the wings to produce the lift even in static conditions and vertical lift. Consequently, the maximum power required for take-off is diminished compared to other solutions. The change of the flight regime is easy accomplished by changing the rotation speed of the propellers. The aircraft according to invention can take off and land on various surfaces, including from/on water and can fly close to the ground or water surfaces, increasing the propulsion efficiency by ground effect. Having a low footprint, this aircraft is well suited for use in confined spaces, characteristic for example of the urban environment. The aircraft have a high level of redundancy and have a low degree of danger, the propellers being protected.

BRIEF DESCRIPTION OF THE DRAWINGS

Below are a number of examples of industrial applicability of the invention in relation to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 and 35 which represent:

FIG. 35, a longitudinal section through an individual aircraft having two biplane propulsion units with ducted fans.

DETAILED DESCRIPTION

Figure 1:
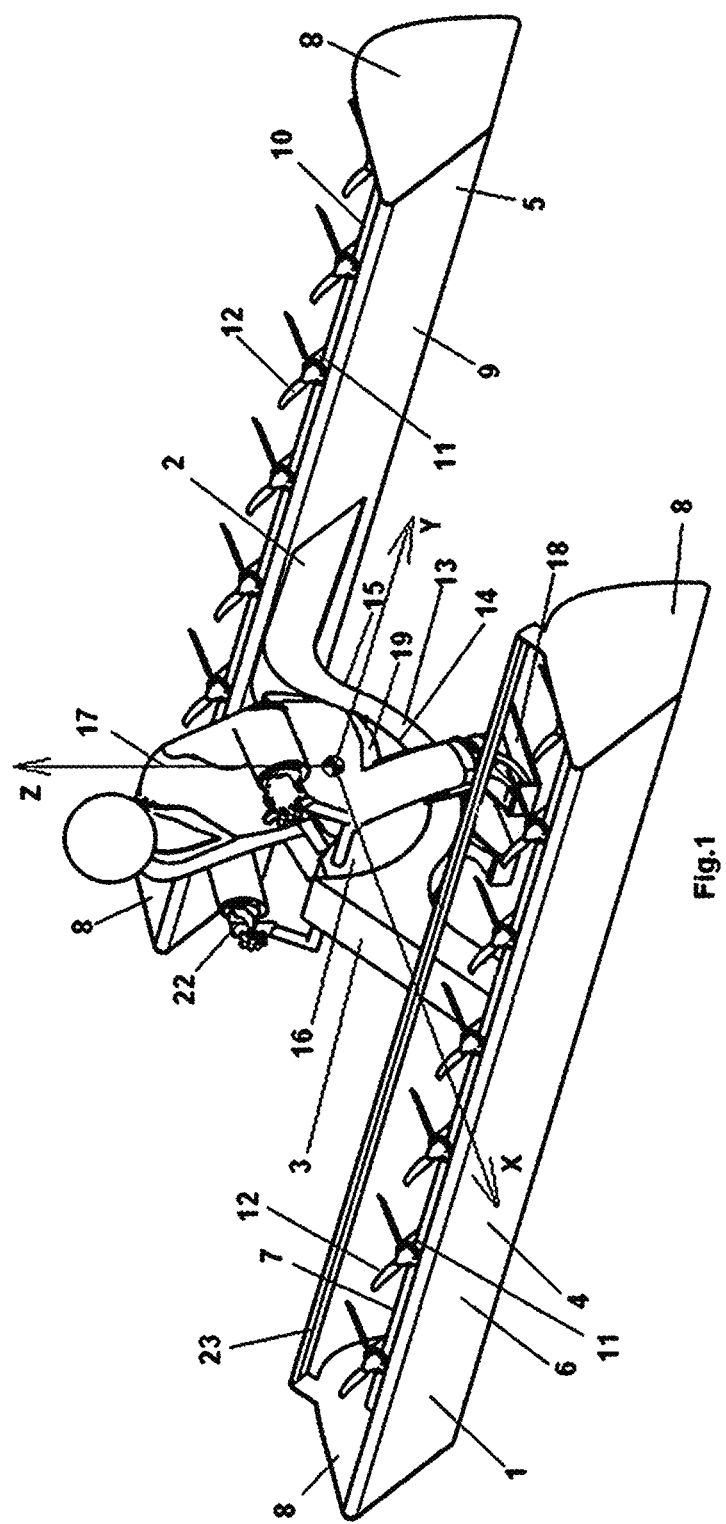
FIG. 1, an isometric view of an individual aircraft having two biplane propulsion units with open tractor propellers in the vertical flight position.
Figure 2:
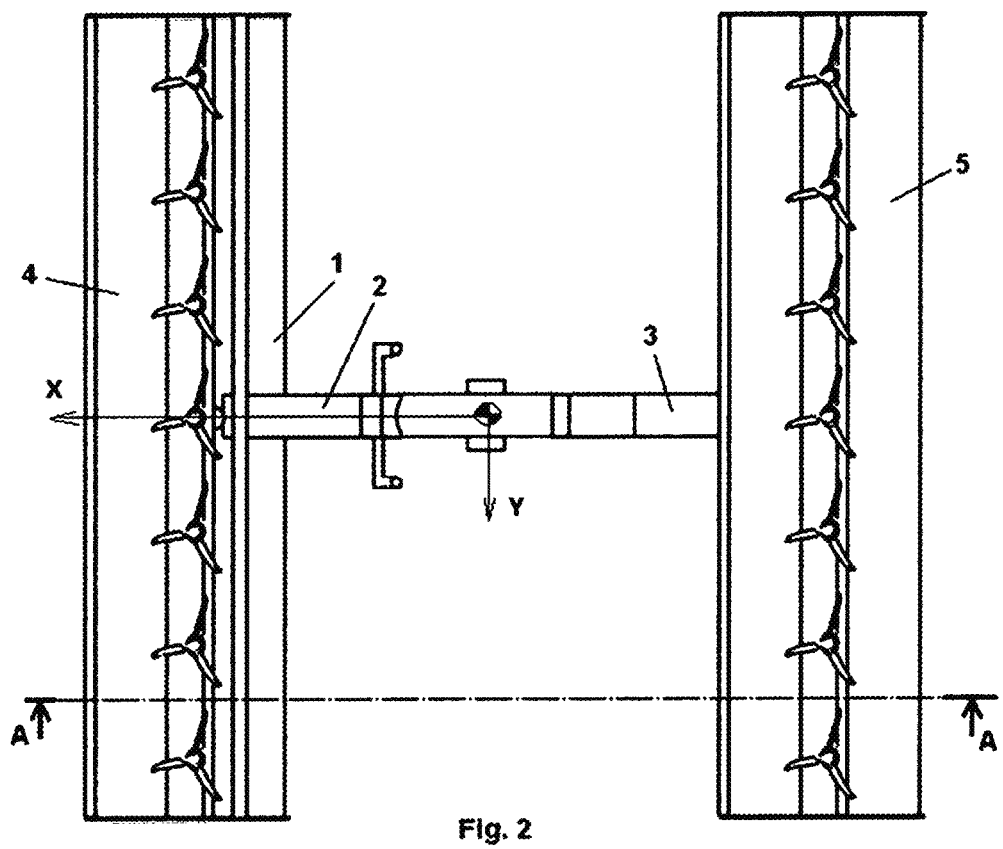
FIG. 2 is a top view of the aircraft of FIG. 1.
Figure 3:
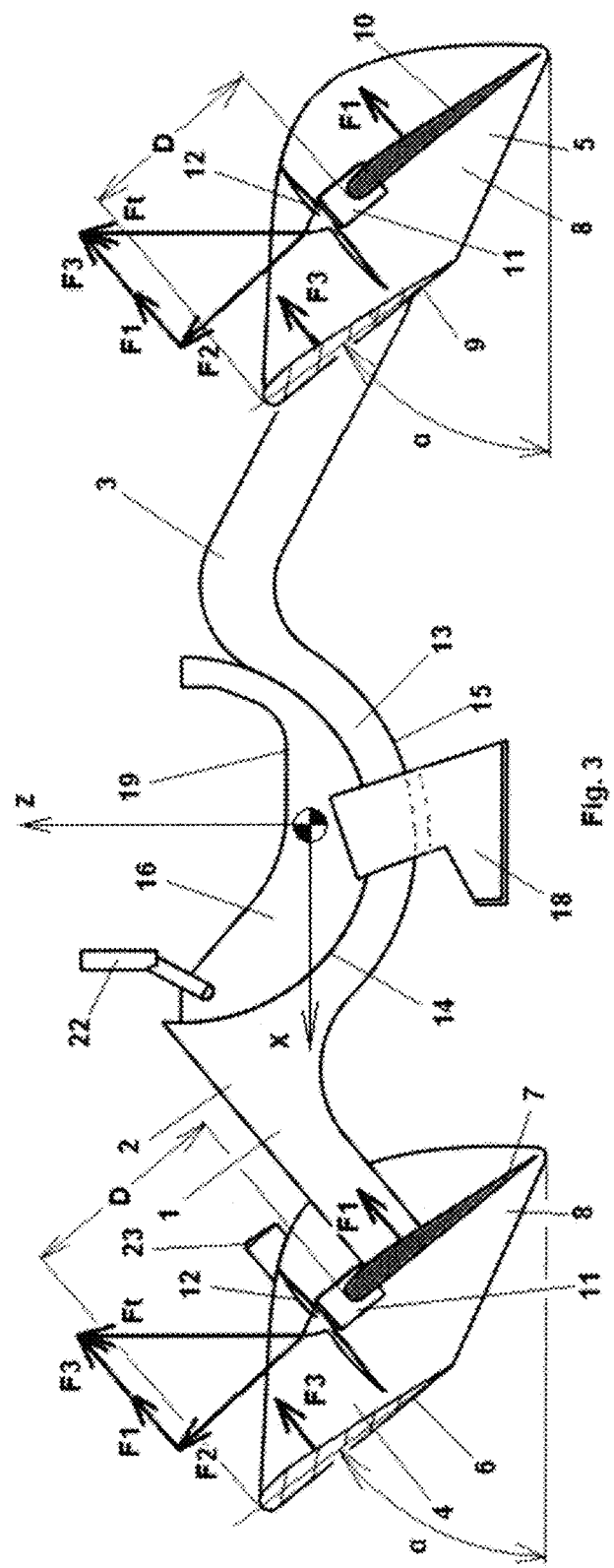
FIG. 3, a section along the A-A axis from the FIG. 2.
Figure 4:
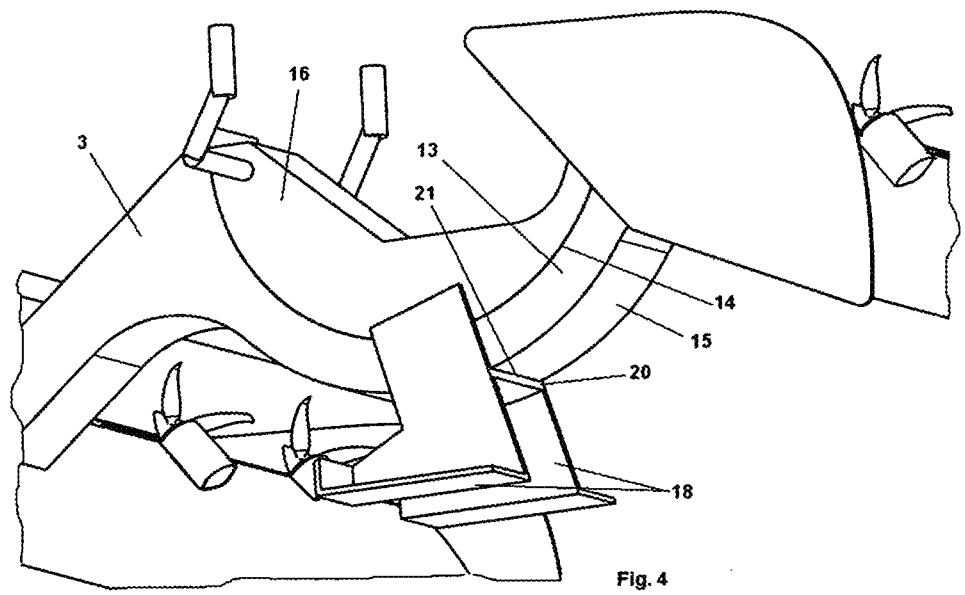
FIG. 4, a partial isometric view from below of the aircraft frame of FIG. 1.
Figure 5:
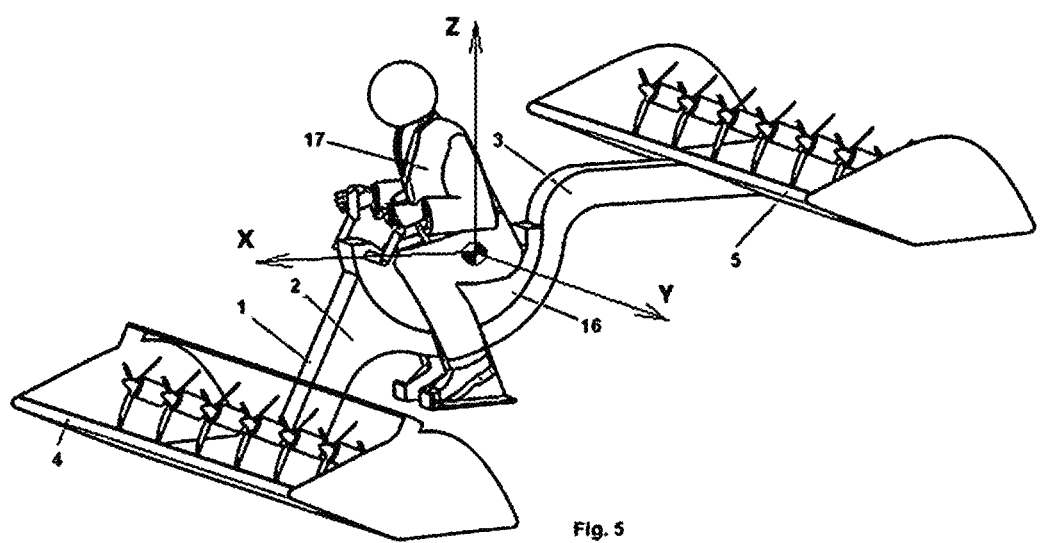
FIG. 5, an isometric view of the aircraft from FIG. 1 in the transition phase.
Figure 6:
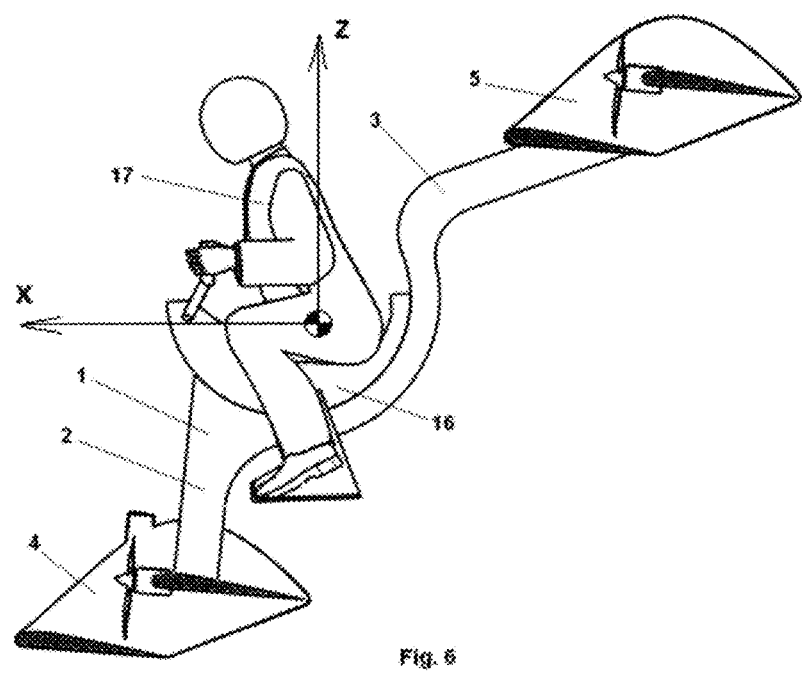
FIG. 6, a longitudinal section through the aircraft from FIG. 1 in forward flight.

In a first embodiment, an individual aircraft 1 with vertical take-off and landing uses a fuselage 2 in the form of a frame 3 that merges two propulsion units 4 and 5, one in the front and other in the rear, each considered as being of biplane type, located at the both ends of the fuselage 2, as shown in FIGS. 1, 2, 3, 4, 5 and 6. The propulsion unit 4 uses a front wing 6 and a rear wing 7, which are considered substantially parallel and spaced within a certain distance D, as shown in FIG. 3. The rear wing 7 is fixed perpendicular to frame 3 in its median area, so that an angle α formed with horizontal plane in the static position is between 25° and 80°, as shown in FIG. 3. The front wing 6 and the rear wing 7 are secured at the ends by two jet limiters 8. The rear propulsion unit 5 uses a front wing 9 and a rear wing 10 which are considered substantially parallel and preferably spaced with the same distance D. The front wing 9 is fixed perpendicularly to the frame 3 in its median area, so that an angle α is formed with the horizontal plane in the static position. The front wing 9 and the rear wing 10 are connected at both ends by two jet limiters 8. The four jet limiters 8 serve as landing gear on the ground for aircraft 1 during the stationary period. On each rear wing 7 and 10 a number of electric motors 11 are mounted on the leading edge, preferably located at equal distances from each other. Each electric motor 11 actuates a tractor propeller 12, which could have a fixed or variable pitch. Also, the tractor propellers 12 can have folding blades. On the propulsion unit 4, the rotational plane of the tractor propellers 12 is located over the upper surface of the front wing 6 and in the vicinity of the trailing edge of the front wing 6. On the propulsion unit 5, the rotational plane of the tractor propellers 12 is located over the upper surface of the front wing 9 and in the vicinity of the trailing edge of the front wing 9. In the median area, respectively of the center of gravity, the frame 3 presents a recess 13 in the form of a cylindrical segment having an inner cylindrical surface 14 and an outer cylindrical surface 15. On the inner cylindrical surface 14 a rotary seat 16 is located for a pilot 17. The seat 16 has in its lower region a semi-cylindrical shape. The seat 16 hosting the pilot 17 is actuated in rotational motion by an automatic system taking into account of the flight regime. The seat 16 has two extensions 18, as support for the legs of the pilot 17, located on both sides of the frame 3 and a saddle 19 on which the pilot 17 is siting. A cross member 20 is placed between the two extensions 18 having inside a cylindrical surface 21 which slides on the outer cylindrical surface 15 of the recess 13. The cross member 20 maintains the seat 16 in the recess 13 in all situation as in show in FIG. 4. Two joysticks 22 mounted on the seat 16 are used for the control of the aircraft 1. The front propulsion unit 4 uses a cross member 23 that protects the pilot 17 in the event of accidental disintegration of tractor propellers 12. For an easy understanding of the figures and of the operation, the drawings contain the coordinate system XYZ with the origin in the center of gravity of the aircraft 1, where: The plane XY is the horizontal plane corresponding with the aircraft 1 in static position before take-off; The direction of X-axis is the direction of forward flight; The direction of the Z-axis is the direction of take-off trajectory. The coordinate system XYZ is in relationship with the seat 16. In operation during take-off/landing the frame 3 has a position considered horizontal and the pilot 17 has a position considered to be vertical (FIGS. 1, 2 and 3). The electric motors 11 actuate the tractor propellers 14. The interaction between the tractor propellers 14 and the rear wings 7 and 10 is similar to that of the blown wings, producing a force F1 considered as being perpendicular to the wings 7 and 10 (FIG. 3). On the other hand, the momentum of the air mass produced by the tractor propellers 14 creates a force F2 along the axis of the electric motors 11 and is inclined upwards. At the same time, the tractor propellers 14 create a strong depression on each front wing 6 and 9 which results in a force F3 perpendicular to the front wings 6 and 9, as shown in FIG. 3. The forces F1, F2 and F3 are vectorially added and create a total lift force Ft oriented upwards, which produces the lifting of the aircraft 1 from the ground in case of take-off. The Ft force is approximately 30% larger than the F2 force that is commonly used to lift conventional VTOL aircraft. After the aircraft 1 reaches certain altitude, the tractor propellers 14 located in the rear are further accelerated compared to the ones located in front, which produces the change of the pitch angle of the aircraft 1, entering in the transition phase as in the FIG. 5. At the same time the position of the pilot 17 is maintained as in the take-off phase by rotating the seat 16. The change of the pitch angle of the aircraft 1 continues until the front wings 6 and 9 respectively the rear wings 7 and 10 reach the angle of incidence corresponding to the forward flight, together with the corresponding change in position of the seat 16 that keeps the pilot 17 as in the take-off phase (FIG. 6). Gradually the aircraft 1 reaches cruise speed and the forward stabilized flight in when lift produced by the front wings 6 and 9 respectively by rear wings 7 and 10 is produced in the conventional manner. During the landing the described phases are reversed. The control of the direction of the aircraft 1 is also achieved by the variation of the rotational speed of the various tractor propellers 14.

Figure 7:
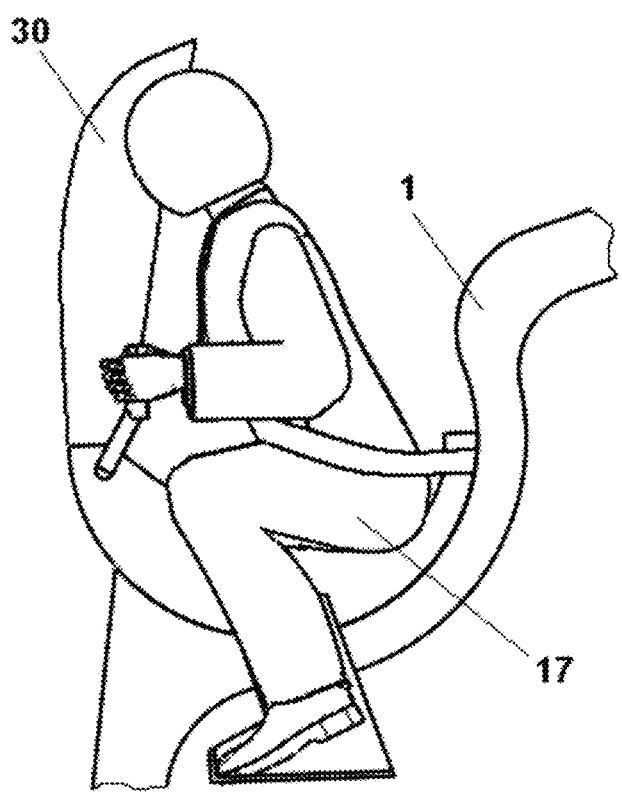
FIG. 7, a partial side view of an individual aircraft with a frontal windscreen.
Figure 8:
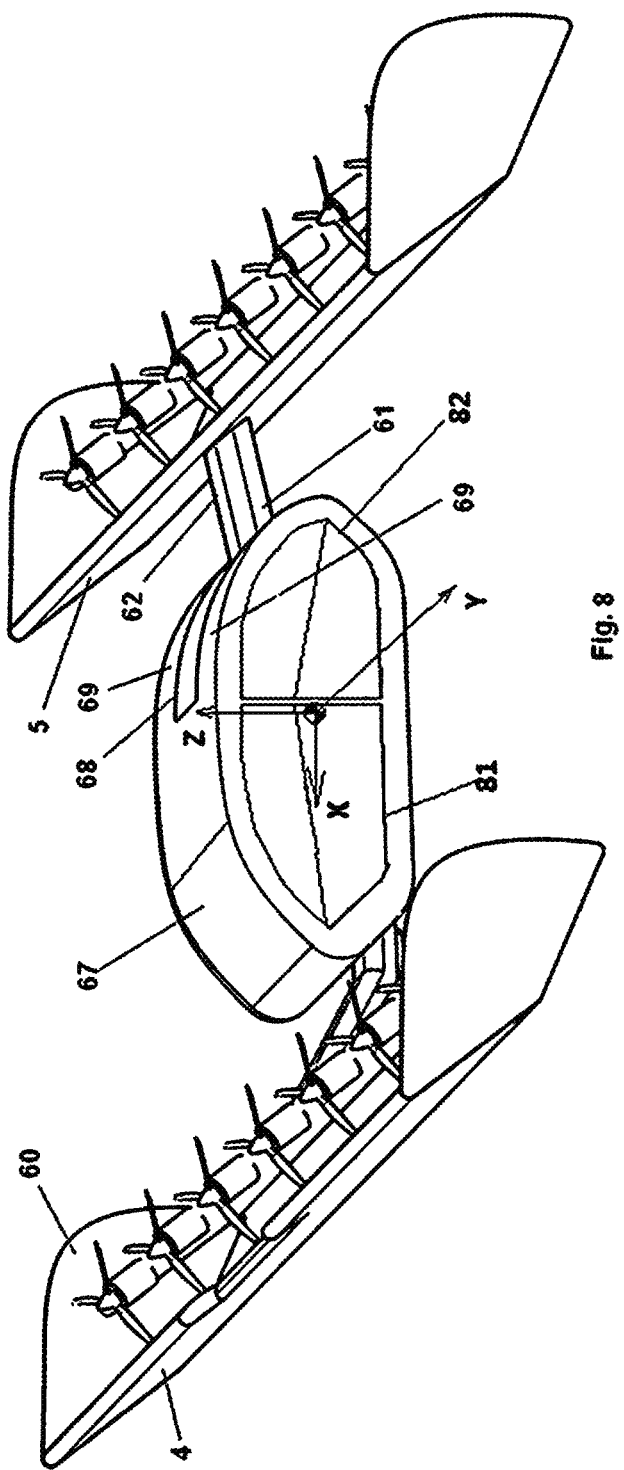
FIG. 8, an isometric view of a cabin aircraft having two biplane propulsion units with open tractor propellers in vertical flight.

In another embodiment, the aircraft 1 uses a windscreen 30, protecting the pilot 17 against the frontal air flow, as shown in FIG. 7.

Figure 9:
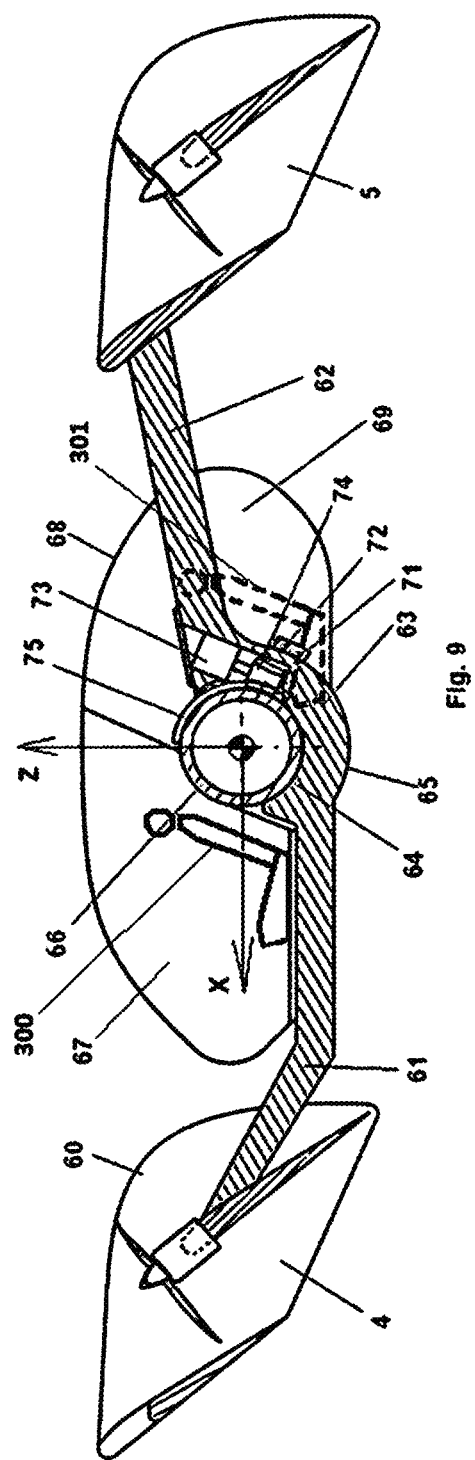
FIG. 9, a median longitudinal section through the aircraft of FIG. 8.
Figure 10:
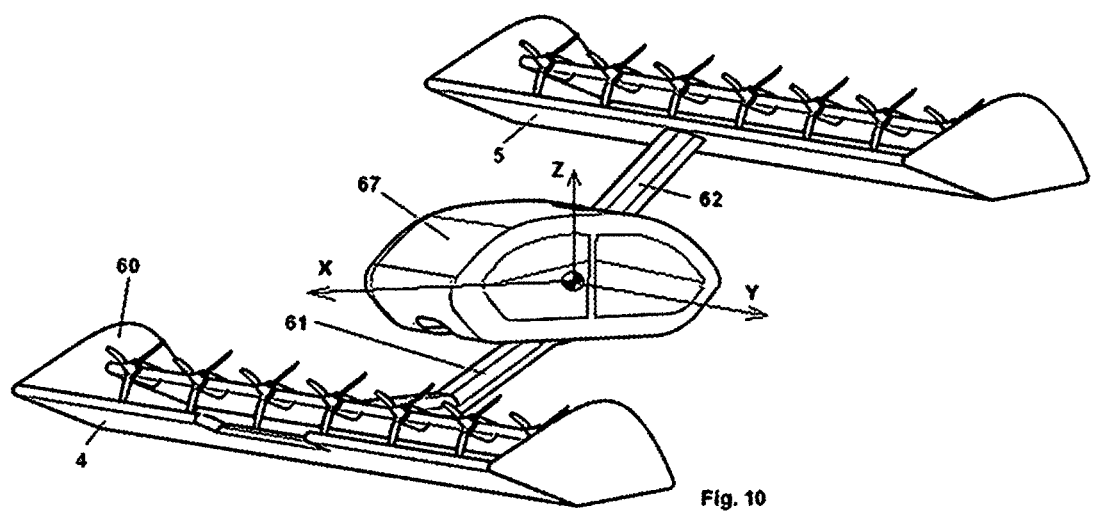
FIG. 10, an isometric view of the aircraft from FIG. 8 in forward flight.
Figure 11:
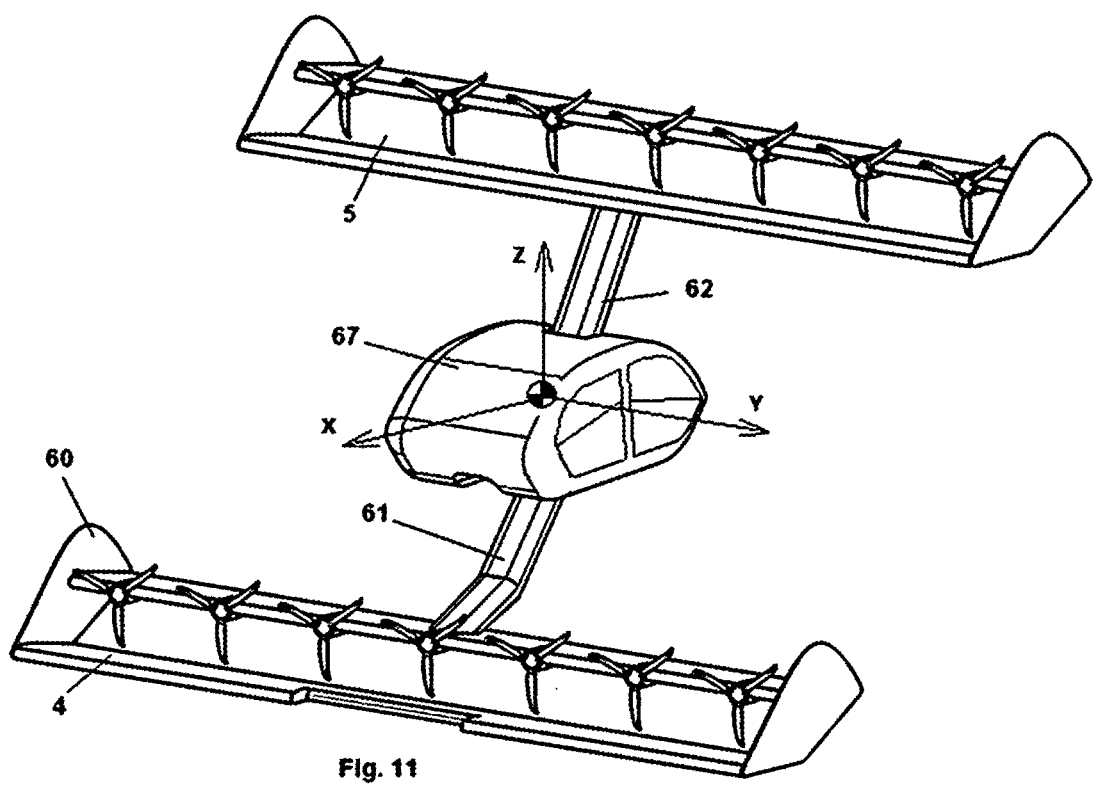
FIG. 11, an isometric view of the aircraft from FIG. 8 in the transition phase.
Figure 12:
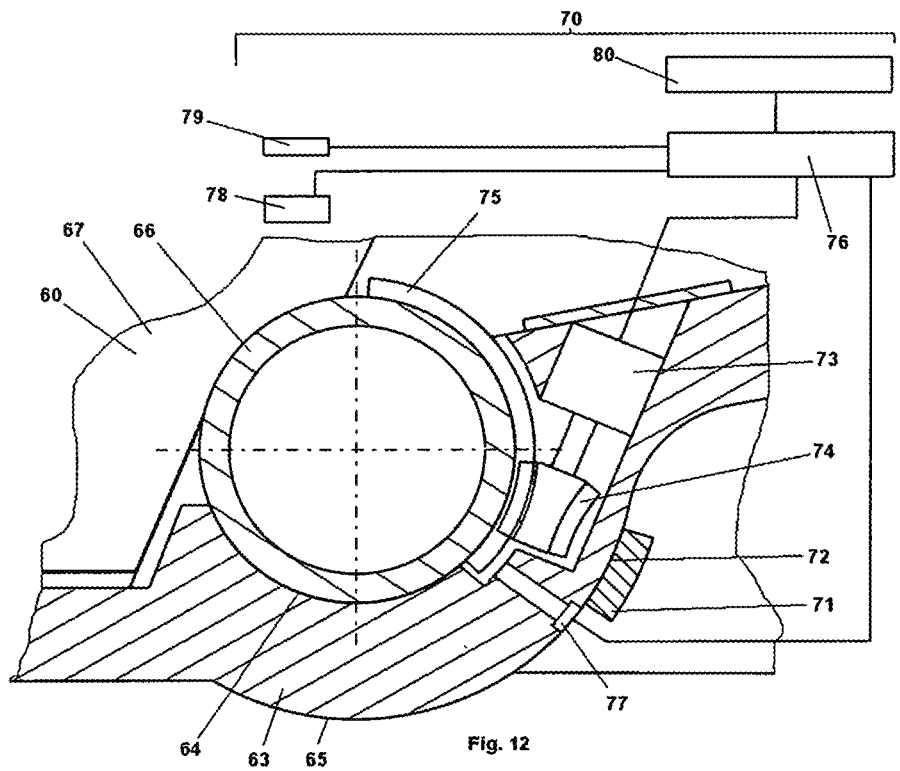
FIG. 12, a detail of the acting mechanism of the seat/cabin and its control system.

In another embodiment, an aircraft 60, with vertical take-off and landing, can carry several persons using a fuselage 61 in the form of a frame 62 that merges front propulsion unit 4 and a rear propulsion unit 5, of the biplane type, located at the ends of the fuselage 61, as shown in FIGS. 8, 9, 10, 11 and 12. In the middle area, respectively substantially in the center of gravity, the frame 62 presents a recess 63 in the form of a cylindrical segment having an inner cylindrical surface 64 and an outer cylindrical surface 65, as shown in FIG. 9. On the inner cylindrical surface 64 a shaft 66 can be rotated in relationship with a cabin 67, for pilot, passengers and payloads. The rotating shaft 66 is fixed in the middle area, respectively substantially in the center of gravity of the cabin 67. The cabin 67, which has a flattened aerodynamic shape for reduced drag, is mounted symmetrically on the median area with respect to the frame 62. At the rear the cabin 67 has a cut 68, which splits it into two parts 69, the cut 68 allowing to avoid the contact with the frame 62 in various phases of flight. Cabin 67 is operated in rotational motion by an automatic system 70 depending on the flight regime. The two parts 69 are connected by a cross member 71 having a cylindrical surface 72. Inside of the cylindrical surface 72 slides on the outer cylindrical surface 65 of the recess 63 and keeps safely in all situations in the cabin 67 in contact with the recess 63. For an easy understanding of the figures and of the operation, the drawings contain the coordinate system XYZ with the origin in the center of gravity of the aircraft 60, where: The plane XY is the horizontal plane corresponding with the aircraft 60 in static position before take-off; The direction of X-axis is the direction of forward flight; The orientation of the Z-axis is the direction of take-off trajectory. The coordinate system XYZ is in relationship with the cabin 67. During the take-off and landing the cabin 67 is in a horizontal position as in the FIGS. 8 and 9. Due to the automatic system 70, the position of cabin 67 remains constantly horizontal both during the transition (FIG. 10) and during the forward flight period (FIG. 11). The automatic system 70 allows the cabin 67 to be rotated relative to the frame 62 with the help of an actuator 73 which actuates by means of a pinion 74 a toothed sector 75 integrated with the shaft 66 respectively with the cabin 67 (FIG. 12). The actuator 73 is controlled by a controller 76 based on information from a group of sensors including a position sensor 77 of the cabin 67, which perceive its position comparing with the frame 62 position, a gyroscopic platform 78 that perceives the position of cabin 67 in space and a speed sensor 79 indicating the horizontal speed of the aircraft 60. The controller 76 is monitored by an electronic control unit 80 which simultaneously regulates the stability of the aircraft 60, the steering control and the horizontal speed. The access inside the cabin 67 is made by using two front doors 81 and two rear doors 82 disposed side by side and symmetrically on the cabin 67. The front doors 81 allow the access to front seats 300 (FIG. 9). The doors 82 allow the access to rear seats 301, located symmetrically at one part and the other from the cat 68.

A similar automatic system for controlling the position of the seat 16 can be used by the aircraft 1 from the first embodiment.

Figure 13:
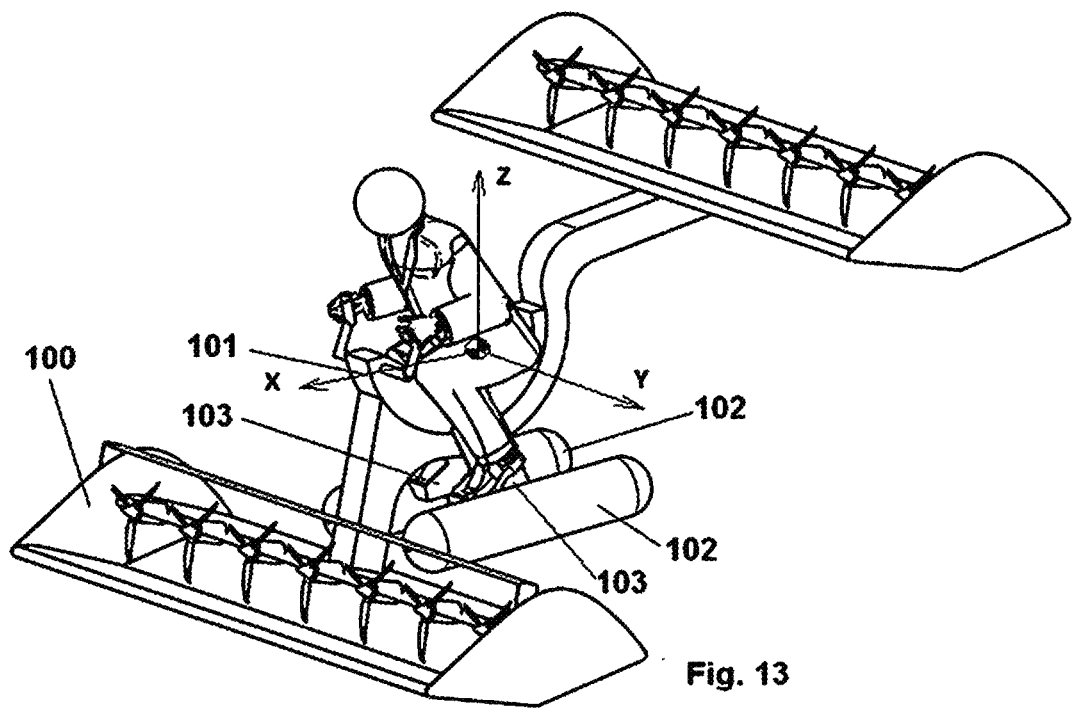
FIG. 13, an isometric view of an amphibious individual aircraft.

In another embodiment, an individual aircraft 100, with vertical take-off and landing, is of amphibious type, as shown in FIG. 13. In this case, a rotating seat 101 has two side floats 102 symmetrically located at on one side and another of the seat 101, attached from two legs supports 103, respectively on the lower side. The floats 102 have an elongated aerodynamic shape.

Figure 14:
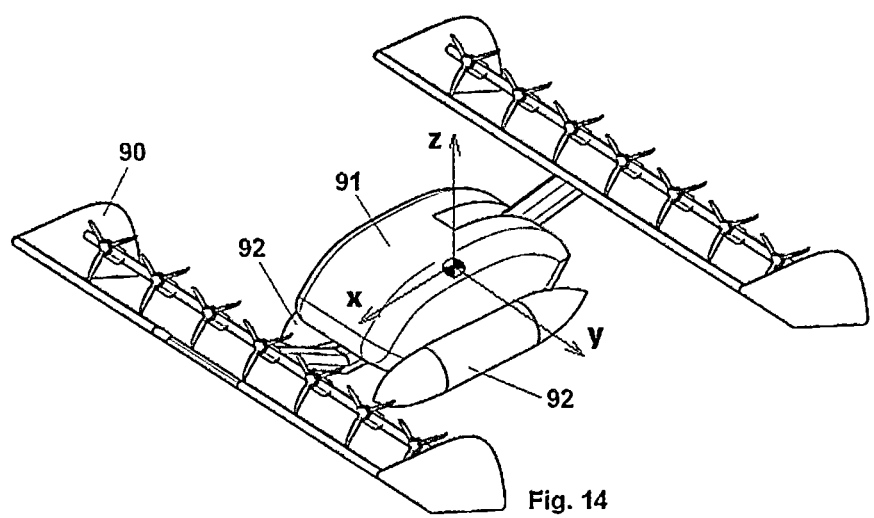
FIG. 14, an isometric view of an amphibious aircraft with cabin.

In another embodiment, an aircraft 90, with vertical take-off and landing, of amphibious type, as show in FIG. 14. In this case, a cabin 91 has two side floats 92 symmetrically located at on one side and another of the cabin 91, respectively on its lower side. The floats 92 have an elongated aerodynamic shape.

The amphibious aircraft described in FIGS. 13 and 14 can be also used as a vehicle with ground effect (Wing In Ground—WIG) and can fly at low height above the ground or above the water surface with increased efficiency.

In another embodiment, an aircraft (not shown) uses a device (not shown) attached to the rotating shaft 66 from FIG. 12, the device maintaining substantially its initial take-off position in all the subsequent flying phases. The device can be a fire fighting system, a robot arm, a multi-scanner or any other device.

Figure 15:
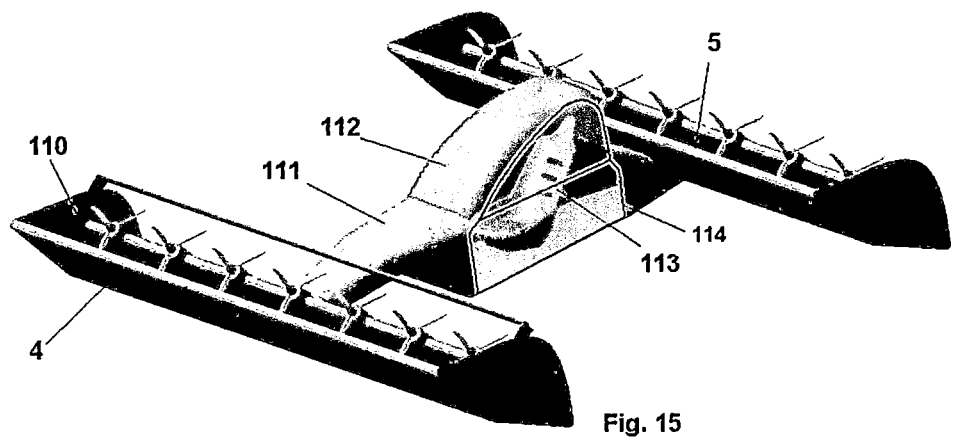
FIG. 15, an isometric view of an individual aircraft with fixed cabin, having two biplane propulsion units with tractor propellers in the vertical flight position.
Figure 16:
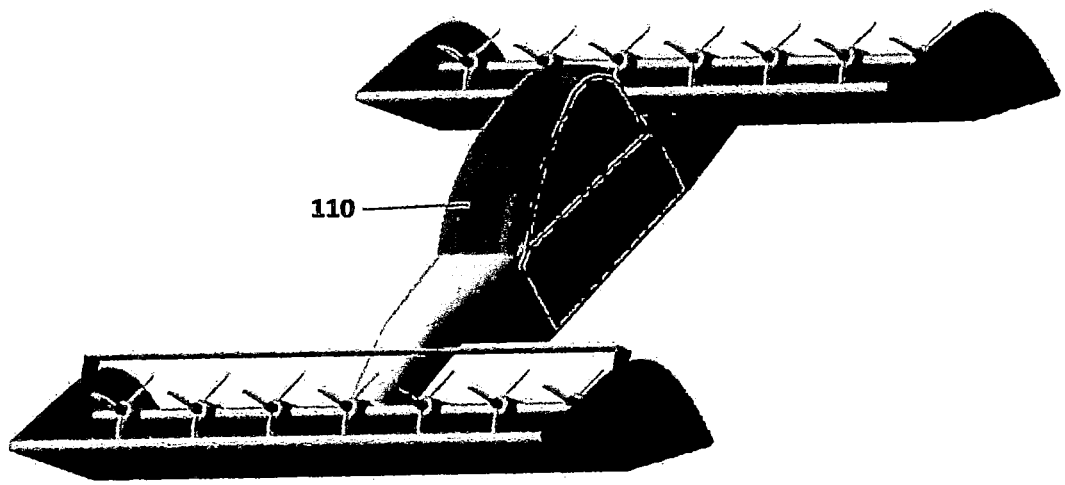
FIG. 16, an isometric view of the aircraft from FIG. 15 in forward flight.

In another embodiment, an individual aircraft 110, with vertical take-off and landing, uses a fuselage 111 that connects two propulsion units 4 and 5 as shown in FIGS. 15 and 16. In the middle area the fuselage 111 contains a cabin 112, having an aerodynamic shape. Inside the cabin 112 is mounted a seat 113. The cabin 112 has two access doors 114, one of them being for emergency cases. The seat 113 is inclined rearwards so that when the aircraft 110 is in forward flight (FIG. 16) the pilot position is substantially vertical.

Figure 17:
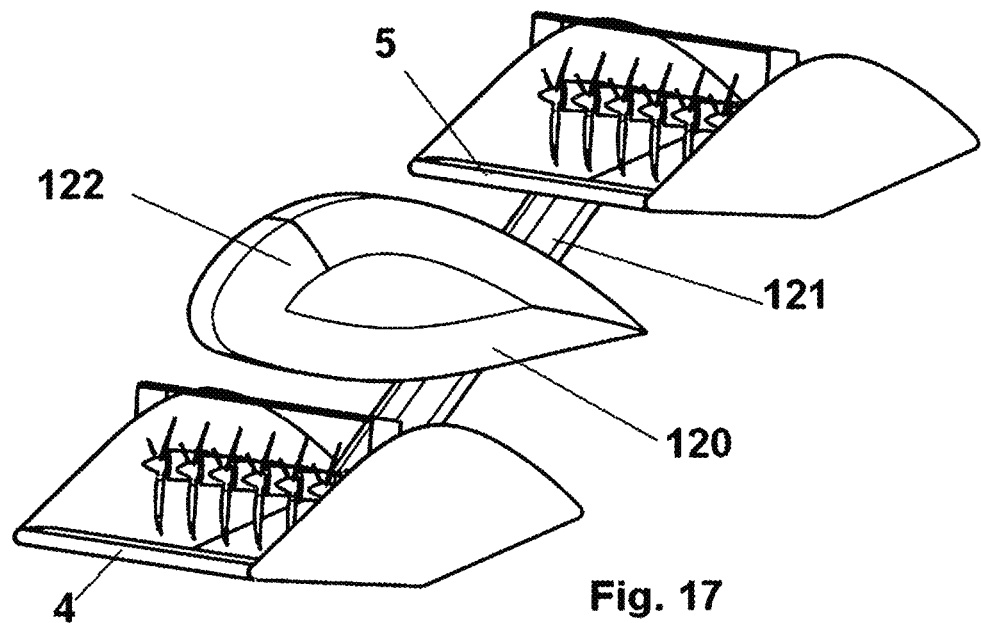
FIG. 17, an isometric view of a drone having two biplane propulsion units with tractor propellers.

In another embodiment, a drone 120, with vertical take-off and landing, uses a fuselage 121 that connects two propulsion units 4 and 5 as shown in FIG. 17. In the middle area the fuselage 121 contains a nacelle 122, having an aerodynamic shape, aligned with the airfoil of the wings 6, 7, 9 and 10.

Figure 18:
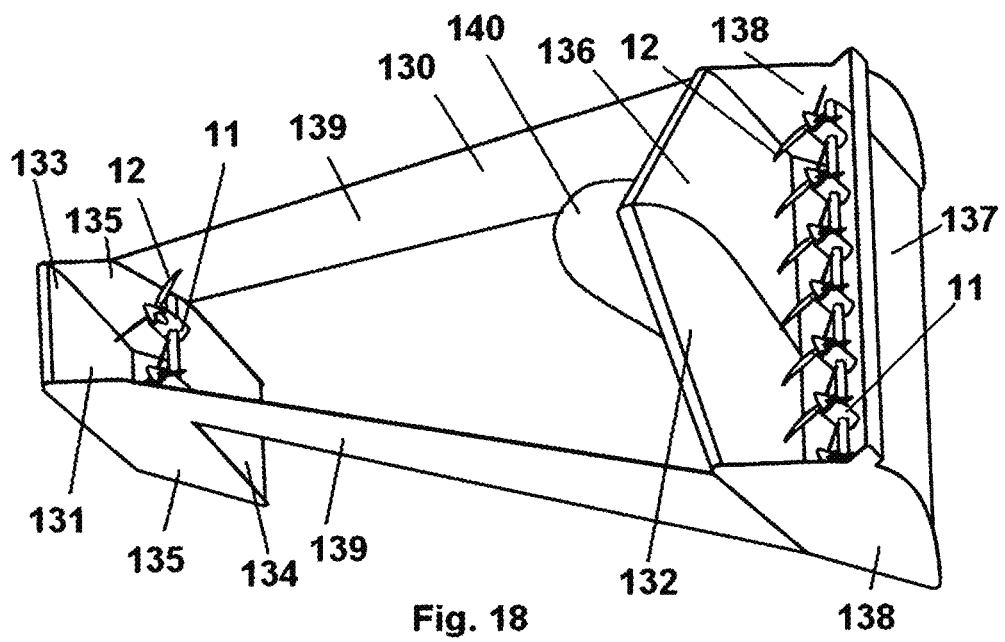
FIG. 18, an isometric view of a drone having two biplane propulsion units with tractor propellers having different sizes in the vertical flight position.
Figure 19:
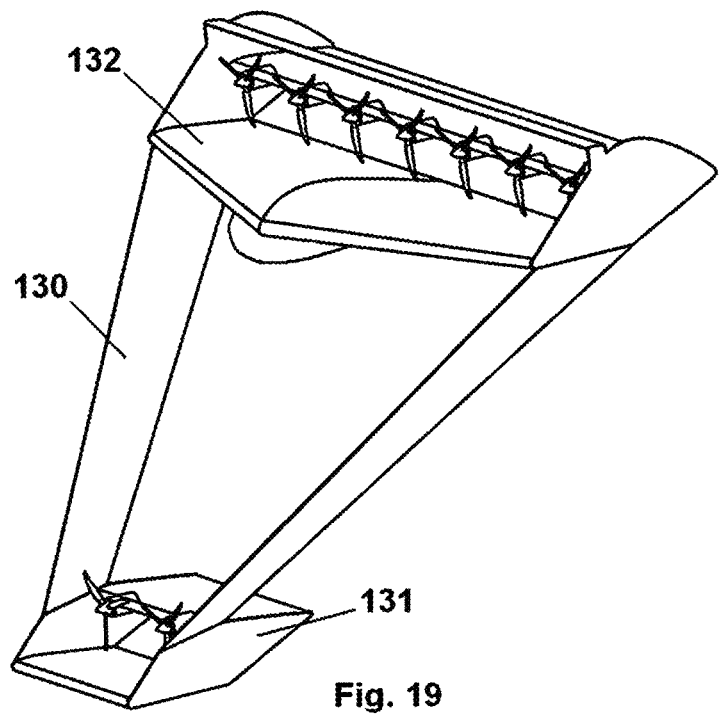
FIG. 19, an isometric view of the drone from the FIG. 18 in forward flight.

In another embodiment, a drone 130, with vertical take-off and landing, uses a front propulsion unit 131 and a rear propulsion unit 132 as shown in FIGS. 18 and 19. The front propulsion unit 131 contains a front wing 133 and a rear wing 134. On the rear wing 134 are attached a number of electric motors 11, each acting a tractor propeller 12. The front wing 133 and the rear wing 134 are secured at ends by two jet limiters 135. The rear propulsion unit 132 contains a front wing 136 and a rear wing 137. On the rear wing 137 are mounted a number of electric motors 11, each acting a tractor propeller 12. The front wing 136 and the rear wing 137 are secured at ends by two jet limiters 138. The front wing 136 can have triangular shape. The front propulsion unit 131 and the rear propulsion unit 132 are connected in the area of the jet limiters 135 and 138 by two strips 139, each having an airfoil profile. In the middle area of the front wing 136 is attached a nacelle 140. The number of tractor propellers 12 of the propulsion unit 131 is lower than the number of tractor propellers 12 of the propulsion unit 132. The minimum number of tractor propellers 12 can be one for the front propulsion unit 131 and two for the rear propulsion unit 132 so three tractor propellers 12 in total. In operation the front propulsion unit 131 is used mainly to ensure the balance of the drone 130 in hover (FIG. 18) as well as in forward flight (FIG. 19). The rear propulsion unit 132 creates the main thrust force in all the flying phases.

Figure 20:
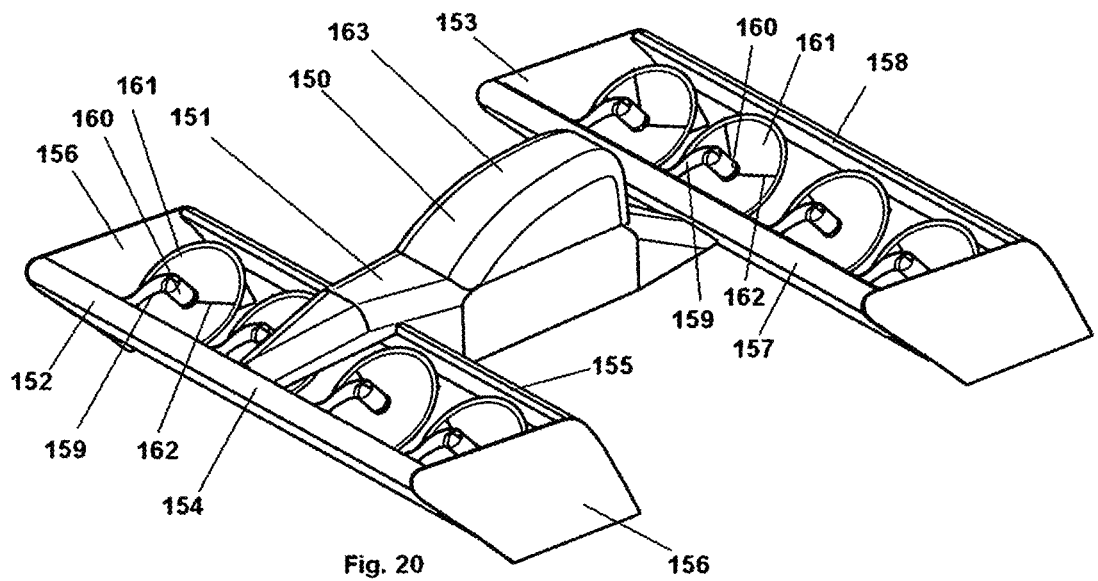
FIG. 20, an isometric view of an individual aircraft with fixed cabin, having two biplane propulsion units with pusher propellers in the vertical flight position.
Figure 21:
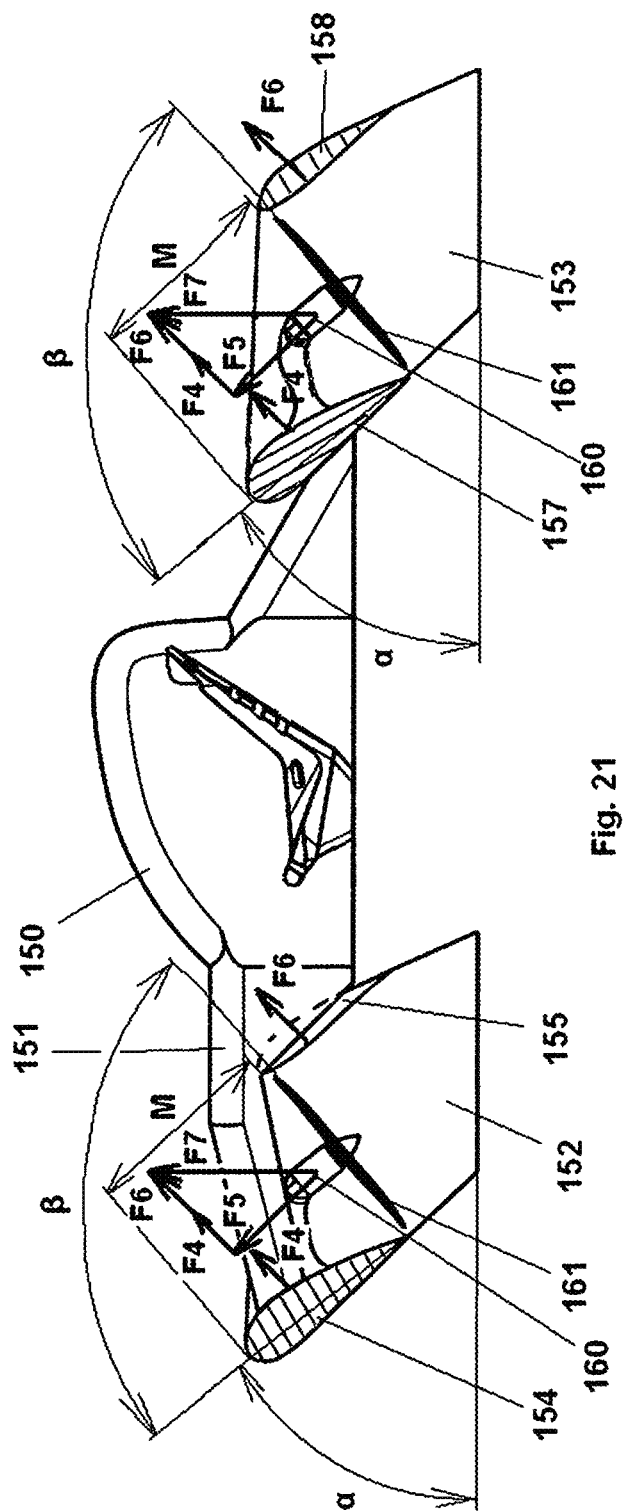
FIG. 21, a section along a longitudinal plane on the aircraft from the FIG. 20.
Figure 22:
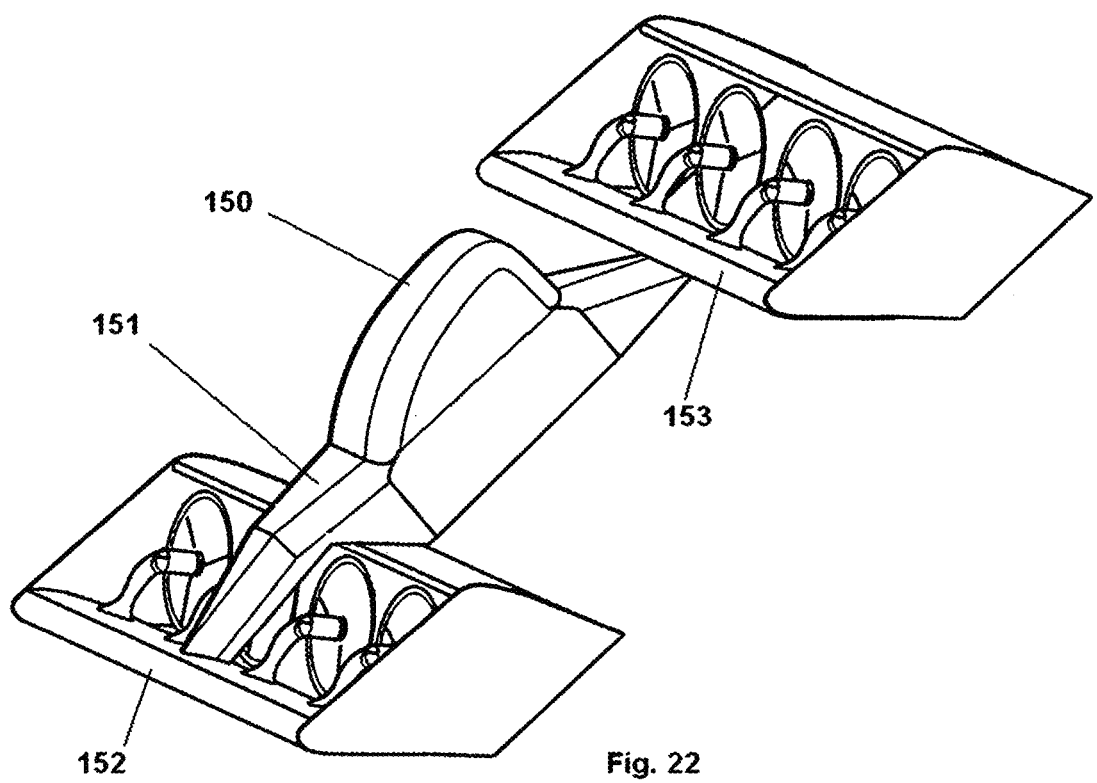
FIG. 22, an isometric view of the aircraft from the FIG. 20 in forward flight.
Figure 23:
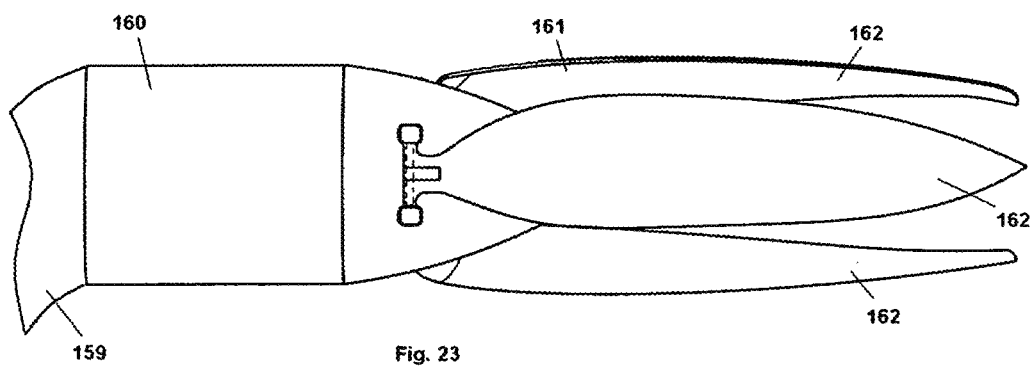
FIG. 23, a side view of electric motor-propeller assembly when the electric motor is not operated.

In another embodiment an individual aircraft 150 with vertical take-off and landing uses a fuselage 151 that connects two propulsion units 152 and 153, one in the front and other in the rear, each considered as being of the biplane type, located at the both ends of the fuselage 151, as shown in FIGS. 20, 21, 22 and 23. The propulsion unit 152 uses a front wing 154 and a rear wing 155, which are substantially parallel and spaced by a certain distance M, as shown in FIG. 21. The front wing 154 is fixed perpendicular to fuselage 151 in its median area, so that an angle α formed with horizontal plane in the static position is between 25° and 80°, as shown in FIG. 21. The front wing 154 and the rear wing 155 are protected at both ends by means of two jet limiters 156. The rear propulsion unit 153 uses a front wing 157 and a rear wing 158 which are parallel and preferably spaced with a distance M. The front wing 157 is attached perpendicularly to the fuselage 151 in its median area, so that an angle α is formed with the horizontal plane in the static position. The front wing 157 and the rear wing 158 are protected at both ends by means of two jet limiters 156. The four jet limiters 156 serve as landing gear in contact with the ground surface for aircraft 150 during the stationary period. On each front wing 154 and 157 a number of electric motors 160 are mounted by brackets 159, preferably located at equal distances from each other. Each electric motor 160 actuates a pusher propeller 161, which have some blades 162 of pivoting type as in FIG. 23. On the propulsion unit 152, the rotational plane of the pusher propellers 161 is located above the upper surface of the front wing 154 and in the vicinity of the trailing edge of the front wing 154. Also, the rotational plane of the pusher propellers 161 makes an angle β a value between 80° and 140° in rapport to the front wing 154. On the propulsion unit 152, the rotational plane of the pusher propellers 161 is located under the lower surface of the rear wing 155 and in the vicinity of the leading edge of the rear wing 155. On the propulsion unit 153 the rotational plane of the pusher propellers 161 is located above the upper surface of the front wing 157 and in the vicinity of the trailing edge of the front wing 157. Also, the rotational plane of the pusher propellers 161 makes an angle β with a value between 80° and 140° in rapport to the front wing 157. In the median area, the fuselage 151 presents a cabin 163, having an aerodynamic shape. On the propulsion unit 153, the rotational plane of the pusher propellers 161 is located under the lower surface of the rear wing 157 and in the vicinity of the leading edge of the rear wing 158. In operation during take-off/landing the fuselage 151 has a position considered horizontal as shown in FIGS. 20 and 21. The electric motors 160 actuate the pusher propellers 161. The pusher propellers 14 increases the air pressure on the lower surface of the rear wings 155 and 158, producing a force F4 considered as being perpendicular to the rear wings 155 and 158 (FIG. 21). The momentum of the air mass produced by the pusher propellers 161 creates a force F5 along the longitudinal axis of the electric motors 160 and is inclined upwards. At the same time, the pusher propellers 161 create a strong depression on each front wing 154 and 157 which results in a force F6 perpendicular to the front wings 154 and 157. The forces F4, F5 and F6 are vectorially added and create a total lift force F7 oriented upwards, which produces the lifting of the aircraft 151 from the ground at take-off. The F7 force is approximately 30% larger than the F4 force that is commonly used to lift conventional VTOL aircraft. After the aircraft 150 reaches certain altitude, the pusher propellers 161 located in the rear are further accelerated compared to the ones located in front, which produces the change of the pitch angle of the aircraft 150, transferring to the forward flight phase as shown in FIG. 22. After reaching the cruise speed a part of the electric motors 160 are deactivated and the frontal air pushes the blades 162 of the corresponding pusher propellers 161 in the long of the longitudinal axis of the electric motors 160 as in FIG. 23. In this case the energy consumption is reduced concomitantly with the drag.

Figure 24:
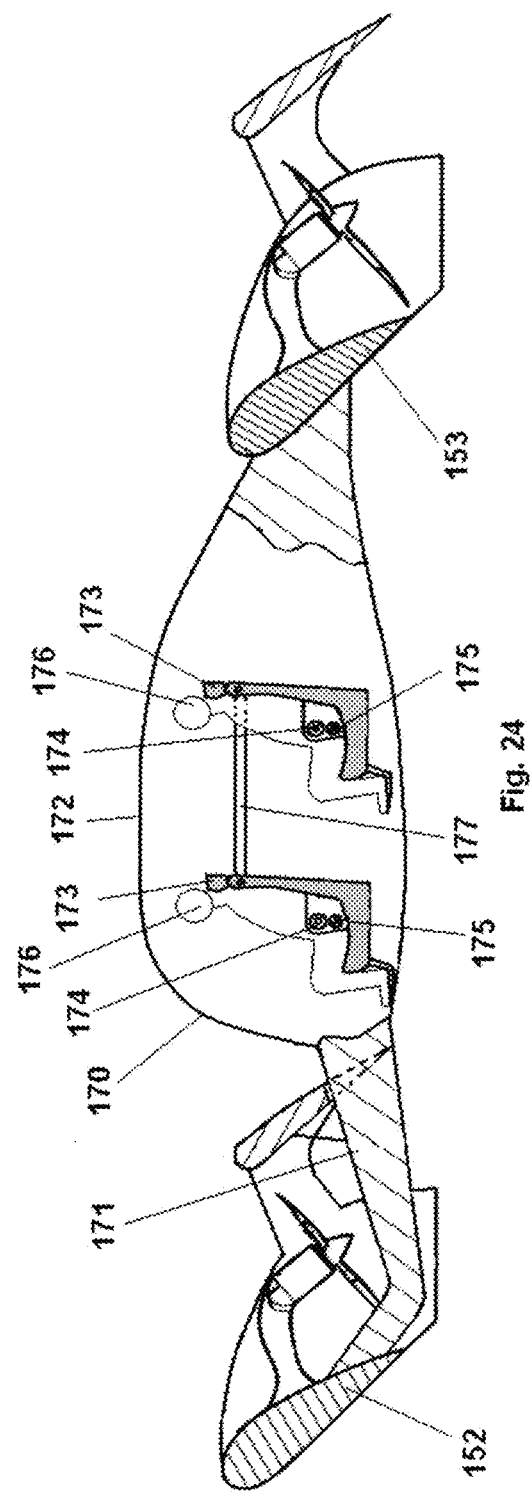
FIG. 24, an isometric view of a passenger aircraft with fixed cabin, having two biplane propulsion units with pusher propellers in the vertical flight position.
Figure 25:
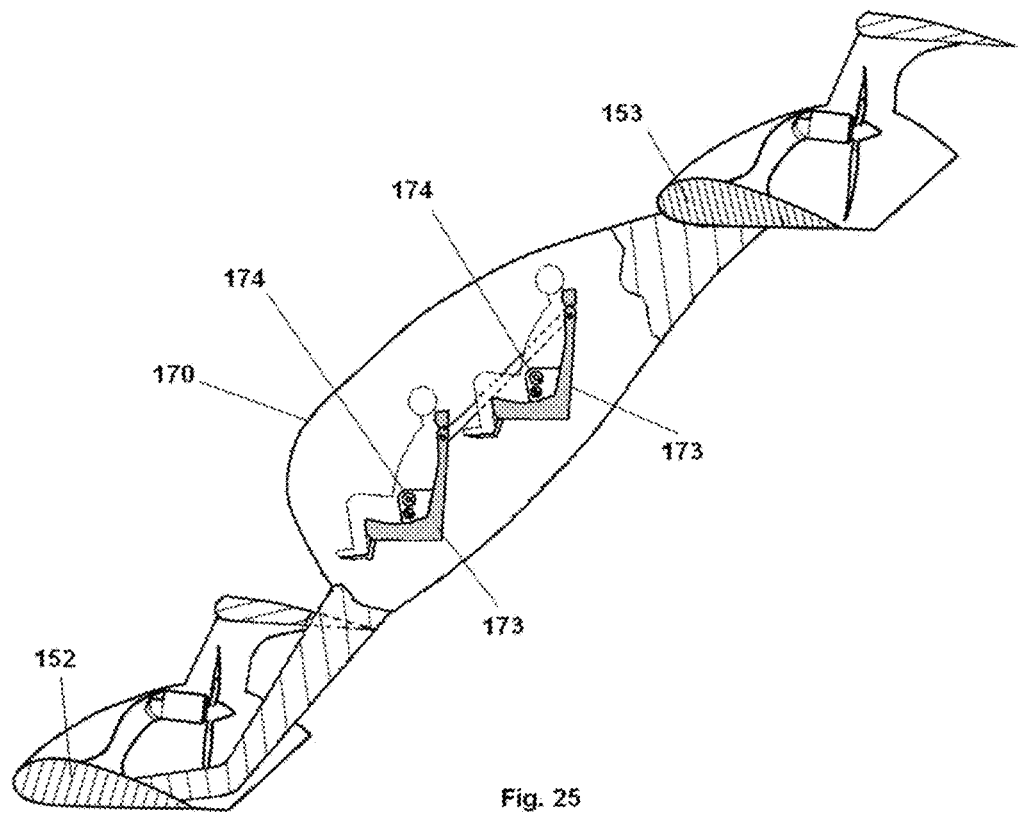
FIG. 25, a section along a longitudinal plane on the aircraft from the FIG. 24 in forward flight.

In another embodiment a passenger aircraft 170, with vertical take-off and landing uses a fuselage 171 that connects two propulsion units 152 and 153, one in the front and other in the rear, of the biplane type, located at both ends of the fuselage 171, as shown in FIGS. 24 and 25. In the middle area the fuselage 171 contains a cabin 172, having an aerodynamic shape that contains at least two seats 173, placed on rows. Each seat 173 is secured by two joints 174, located above a center of gravity 175 of the seat 173, considered when a passenger 176 is seated. The two seats 173 are rotatable connected by a rod 177. During the take-off and landing the cabin 172 is in a horizontal position as shown in FIG. 24. The passenger 176 is in a normal seated position. When the inclination of the cabin 172 is gradually changed until the forward flight position (FIG. 25), the seats 173 begin to rotate, on the joint 174, under the influence of the gravitational force, maintaining the initial comfortable position of the passengers 176. The rod 177 synchronizes the motion of the two seats 173.

In another variant derived from the previous one the rotation of each seat is made by an actuator (not shown) controlled by an automatic control system.

Figure 26:
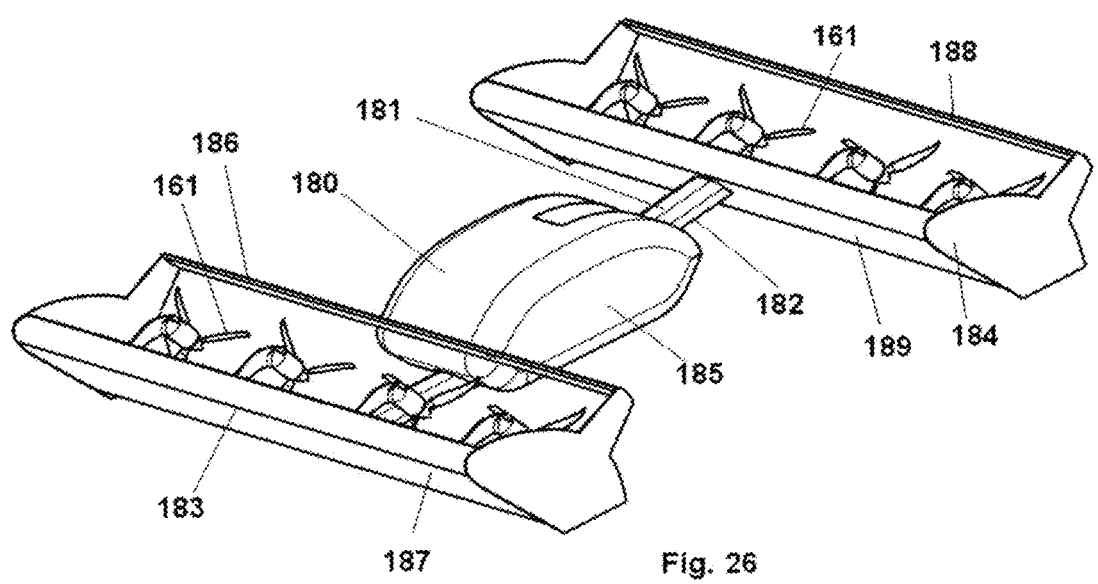
FIG. 26, an isometric view of an individual aircraft with rotating cabin, having two biplane propulsion units with pusher propellers.

In another embodiment, an aircraft 180, with vertical take-off and landing, can carry several persons using a fuselage 181 in the form of a frame 182 that connects a front propulsion unit 183 and a rear propulsion unit 184, located at both ends of the fuselage 181, as shown in FIG. 26. In the middle area, respectively substantially in the vicinity of the center of gravity of the aircraft 180, a cabin 185 is rotatable mounted, having an aerodynamic flattened shape, with reduced drag. The front propulsion unit 183 uses a rear wing 186 which is smaller than a front wing 187. The rear propulsion unit 184 uses a rear wing 188 which is smaller than a front wing 189. Also, in this case the cabin 185 remains in horizontal position in all the flight phases.

Figure 27:
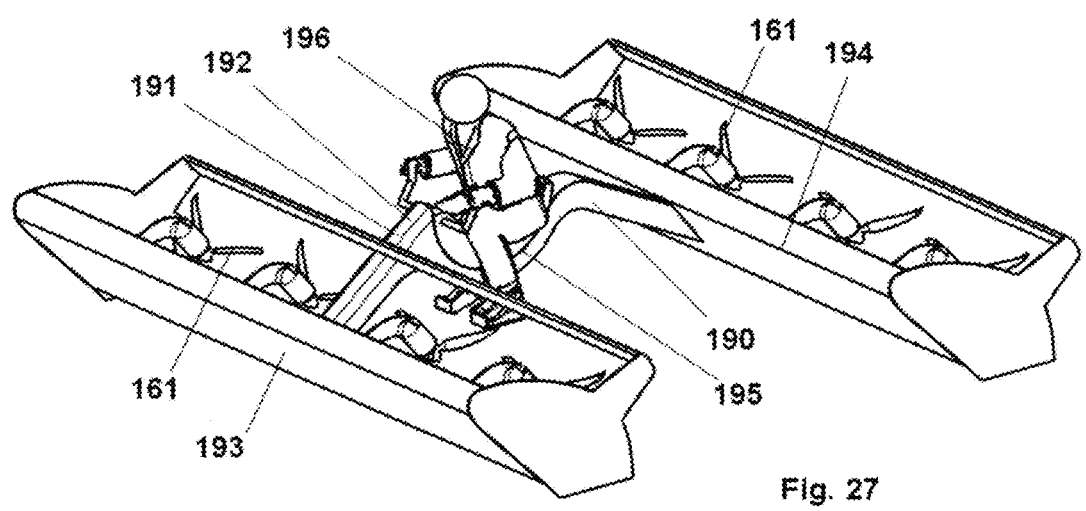
FIG. 27, an isometric view of an individual aircraft with rotating seat, having two biplane propulsion units with pusher propellers.

In another embodiment, an individual aircraft 190, with vertical take-off and landing, can carry a single person using a fuselage 191 in the form of a frame 192 that connects a front propulsion unit 193 and a rear propulsion unit 194, located at both ends of the fuselage 191, as show in FIG. 27. In the middle area of the fuselage 191, respectively substantially in the center of gravity of the aircraft 190 a seat 195 is rotatable mounted for a pilot 196. The front propulsion unit 193 and the rear propulsion unit 194 use several pusher propellers 161.

Figure 28:
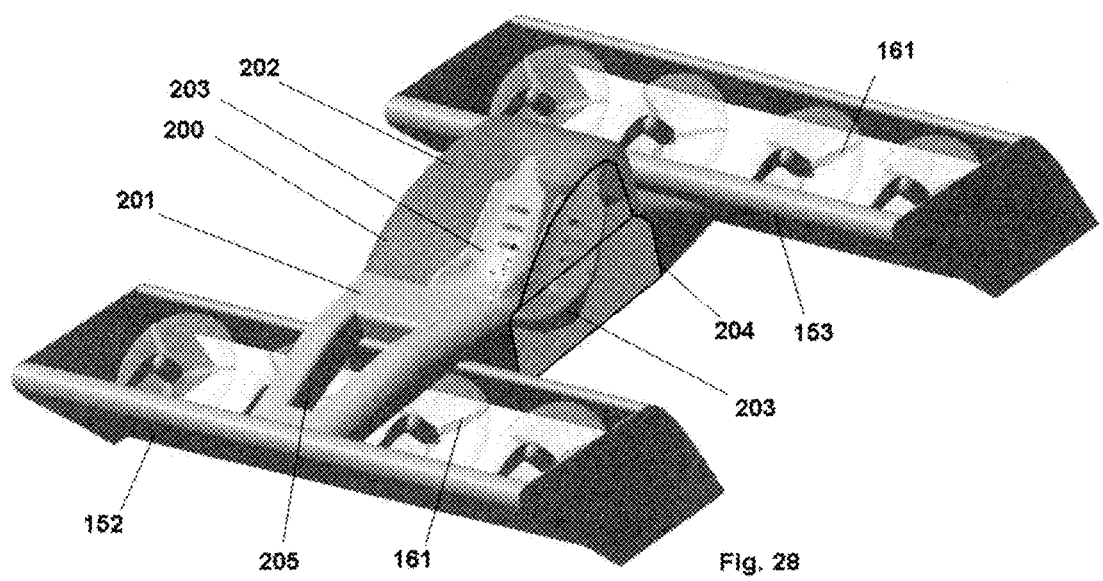
FIG. 28, an isometric view of a two-passenger aircraft with fixed cabin, having two biplane propulsion units with pusher propellers.

In another embodiment an aircraft 200, with vertical take-off and landing, uses a fuselage 201, containing a cabin 202, that merges two propulsion units 152 and 153, one in the front and other in the rear, of the biplane type, located at the ends of the fuselage 201, as shown in FIG. 28. The cabin 202 contains two seats 203, for two passengers. The position of each seat 203 can be adjusted by an actuator (not shown) in relation with the flying phases of the aircraft 200. The cabin 202 has two access doors 204. The fuselage 201 has an opening 205 in the front, preferably having a trapezoidal shape that permits the free circulation of the air flow through the pusher propellers 161, located underneath the fuselage 201.

Figure 29:
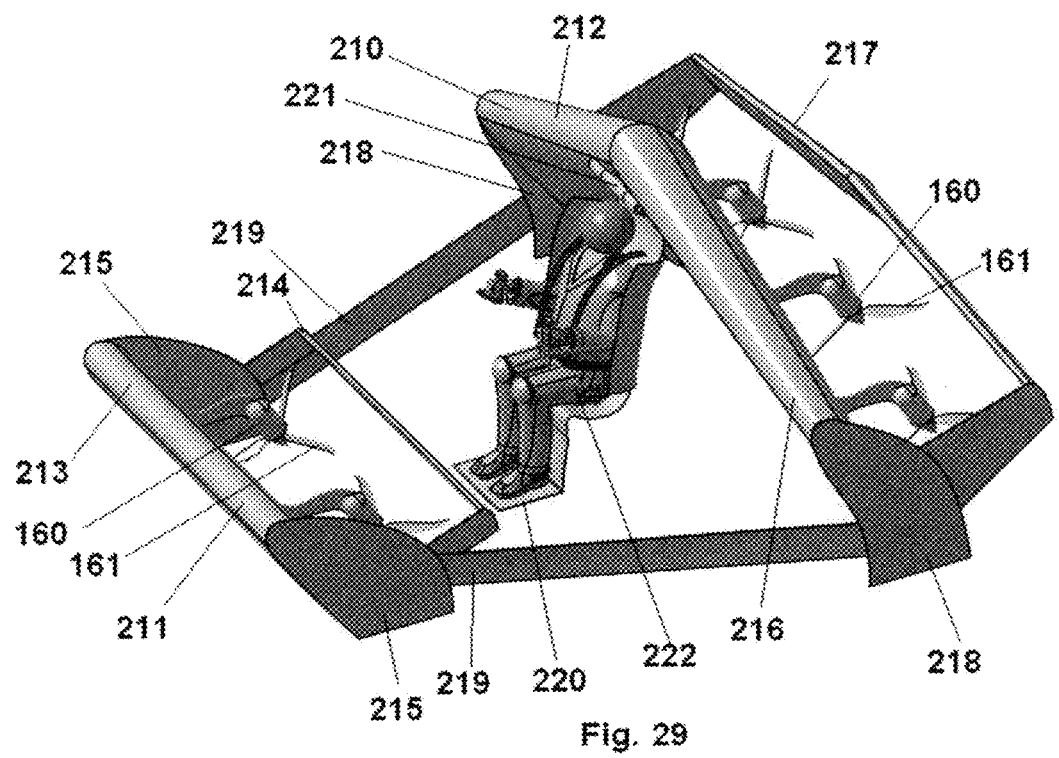
FIG. 29, an isometric view of an individual aircraft having two biplane propulsion units with pusher propellers having different sizes in the vertical flight position.
Figure 30:
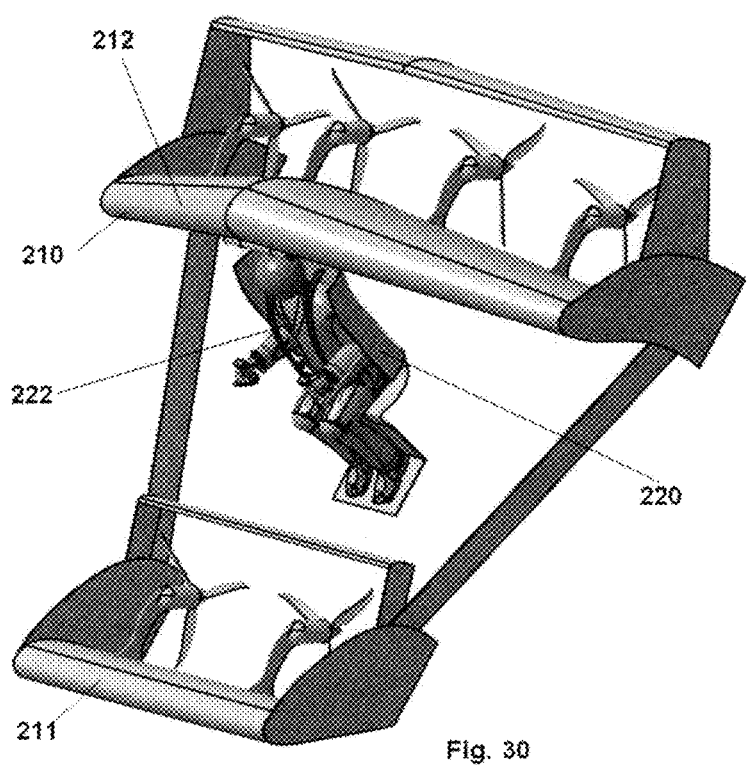
FIG. 30, an isometric view of the aircraft from the FIG. 29 in forward flight.

In another embodiment, an individual aircraft 210, with vertical take-off and landing, uses a front propulsion unit 211 and a rear propulsion unit 212 as shown in FIGS. 29 and 30. The front propulsion unit 211 contains a front wing 213 and a rear wing 214. On the rear wing 214 are mounted a number of electric motors 160, each activating a pusher propeller 161. The front wing 213 and the rear wing 214 are protected at the both ends by two jet limiters 215. The rear propulsion unit 212 contains a front wing 216 and a rear wing 217. On the rear wing 216 are mounted a number of electric motors 160, each activating a pusher propeller 161. The front wing 216 and the rear wing 217 are protected at the both ends by two jet limiters 218. The front wing 216 can have a triangular shape. The front propulsion unit 211 and the rear propulsion unit 212 are connected in the area of the jet limiters 215 and 218 by two strips 219. In the middle area of the front wing 216 a seat 220 is rotatable mounted by a joint 221 located in the upper area of the seat 220. The seat 220 is used by a pilot 222. The number of pusher propellers 161 of the propulsion unit 211 is lower than the number of pusher propellers 161 of the propulsion unit 212. In operation the front propulsion unit 211 is used mainly to ensure the balance of the aircraft 210 in hover (FIG. 29) as well as in forward flight (FIG. 30). The rear propulsion unit 212 is the main source that produces the thrust force in all phases.

The position of the pilot 222 is determined by the equilibrium between the weight of the pilot 222 and the frontal drag which pushes the pilot 222 backwards.

Figure 31:
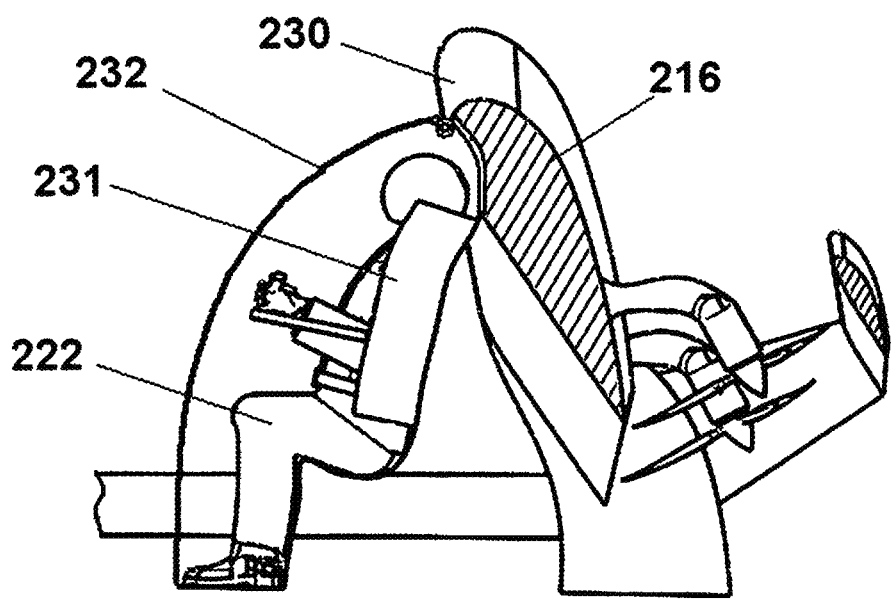
FIG. 31, a section along a longitudinal plane on the aircraft from the FIG. 29 having windshield.

In another embodiment derived from the previous one, an individual aircraft 230 uses a seat 231 occupied by a pilot 222 as shown in FIG. 31. The seat 231 is rigidly mounted on the front wing 216. The pilot 222 is protected from the frontal air flow by a windshield 232.

Figure 32:
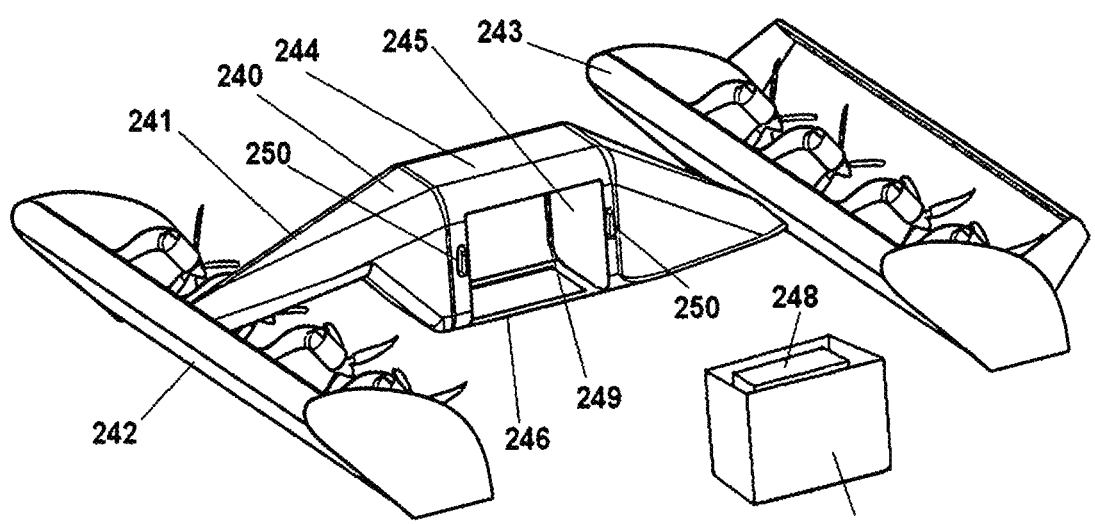
FIG. 32, an isometric view of a delivery drone having two propulsion units with pusher propellers.

In another embodiment, a drone 240, with vertical takeoff and landing, uses a fuselage 241 that connects two propulsion units 242 and 243 as shown in FIG. 32. In the middle area the fuselage 241 has a storage volume 244, with enlarged volume. The storage volume 244 contains a storage compartment 245, having preferably a parallelepipedal shape which is completely open at one side. At the lower part the storage volume 244 has a frame 246. In the storage compartment 245 a container 247 can be transported, which is open to one side and has fitting dimensions with the storage compartment 245. Inside the container 247 is transported a package 248. The container 247 is introduced in the storage compartment 245 where is secured by two limiters 249. On the other side the container 247 is secured by two clasps 250. After the package 248 is delivered to the destination, the container 247 is reintroduced in the storage compartment 245 for the returning flight.

Figure 33:
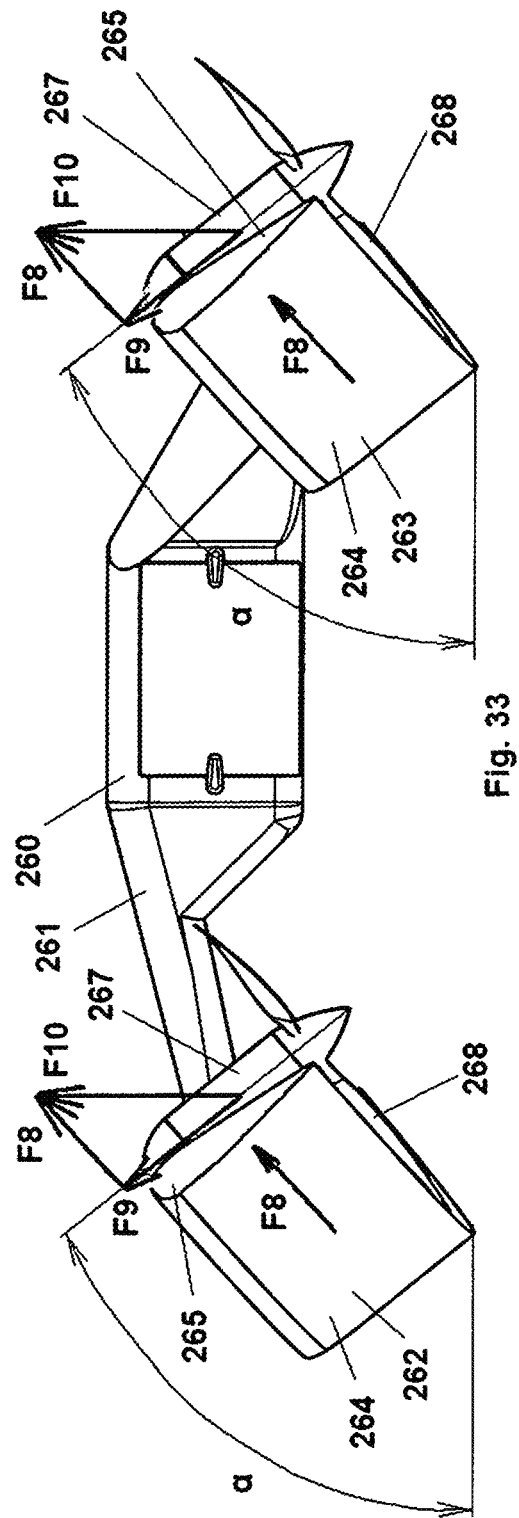
FIG. 33, an isometric view of a delivery drone having two propulsion units with pusher propellers and semicircular wings.
Figure 34:
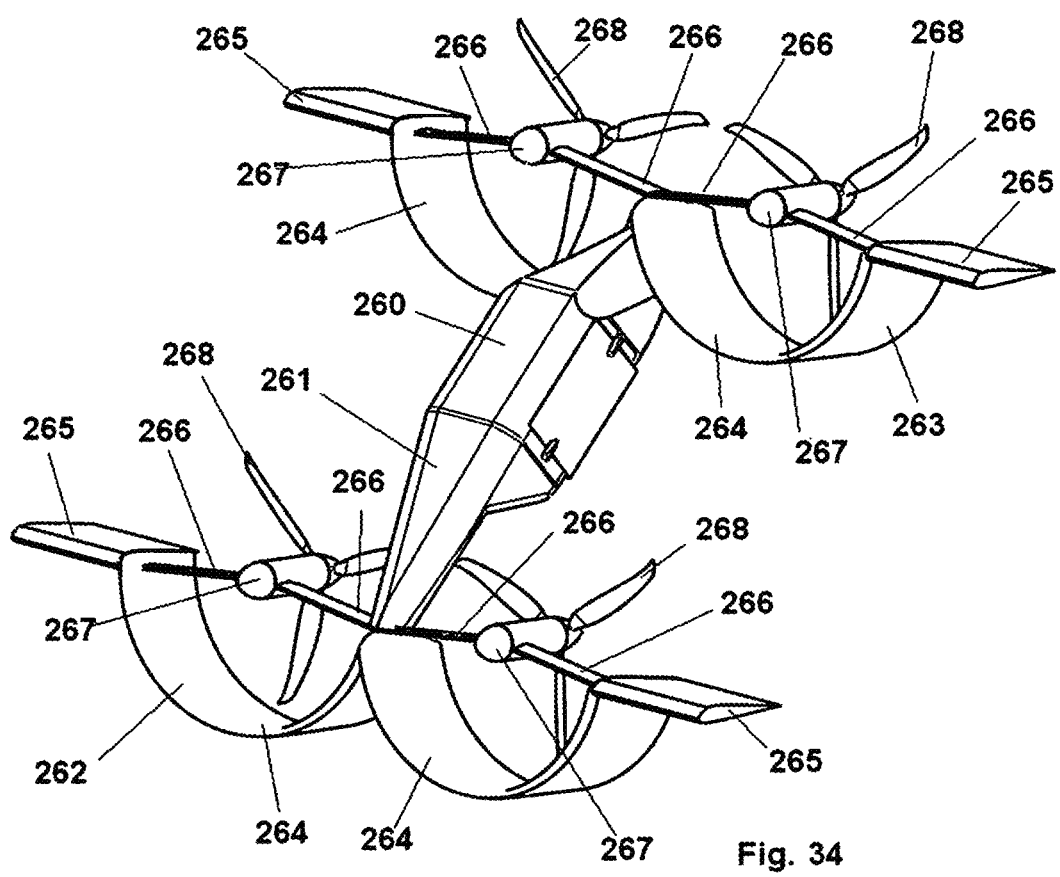
FIG. 34, an isometric view of a delivery drone having two propulsion units with pusher propellers and semicircular wings and additional flat wings.

In another embodiment, a drone 260, with vertical takeoff and landing, uses a fuselage 261 that connects two propulsion units 262 and 263, one in the front and other in the rear, as shown in FIGS. 33 and 34. The propulsion unit 262 uses two semi-circular wings 264, merged to one of them ends which coincides with the median longitudinal plane of the fuselage 261. The semi-circular wings 264 are prolonged at the other ends with two side wings 265, each being perpendicularly on the corresponding semi-circular wing 264. In the center of each semi-circular wing 264 at least on electric motor 267 is mounted using two supports 266. The electric motor 267 actuates a pusher propeller 268. The rotational plane of the pusher propeller 268 is located in the vicinity of the trailing edge of the semi-circular wing 264. The axis of the electric motors 267 and the airfoils of the semi-circular wings 264, of the side wings 265 and of support wings 266 are aligned to form an angle α with the horizontal plane in the static position between 25° and 80°, as shown in FIG. 33. The rear propulsion unit 263 is identical with the front propulsion unit 262 having the semi-circular wings 264 inclined with the same angle α made with the horizontal plane in the static position. In operation during take-off/landing the fuselage 261 has a position considered horizontal as in the FIG. 33. The electric motors 267 actuates the pusher propellers 268. The pusher propellers 268 create a strong depression on the semi-circular wings 264 which produce a force F8 perpendicular on each semi-circular wing 264. The momentum of the air mass produced by the pusher propellers 268 creates a force F9 along the axis of the electric motors 267, which is inclined upwards. The forces F8 and F9 are vectorially added and create a total lift force F10 oriented upwards, which produces the lifting of the drone 260 from the ground in case of take-off. The F10 force is approximately 30% larger than the F9 force that is commonly used to lift conventional VTOL aircraft. After the drone 260 reaches certain altitude, the pusher propellers 268 located in the rear are further accelerated compared to the ones located in front, which produces the change of the pitch angle of the drone 260, making the transition towards the forward flight phase as in the FIG. 34.

In another embodiment, an individual aircraft 280 with vertical takeoff and landing uses two propulsion units 281 and 282 one in the front and other in the rear, each considered as being of the biplane type, located at the both ends of the aircraft 280, as shown in FIG. 35. The front propulsion unit 281, uses a front wing 283 and a rear wing 284, which are parallel and spaced with a certain distance N. The front wing 283 and the rear wing 284 are protected at both ends by two jet limiters 289. The front wing 283 makes an angle α formed with horizontal plane in the static position which is between 25° and 80°. The rear propulsion unit 282 uses a front wing 285 and rear wing 286, which are parallel and spaced with the same distance N. The front wing 285 and the rear wing 286 are protected at both ends by two jet limiters 289. The front wing 285 makes an angle α formed with horizontal plane in the static position which is between 25° and 80°. Between the front wings 283 and rear wing 284 are mounted a number of ducted fans 287 using brackets 288. Between the front wings 285 and the rear wings 286 a number of ducted fans 287 are attached using the brackets 288. In operation during take-off/landing the aircraft 280 has a position considered horizontal. The ducted fans 287 are activated increasing the air pressure on the lower surface of the rear wings 284 and 286, producing a force F11 considered as being perpendicular to the rear wings 284 and 286. On the other hand, the momentum of the air mass produced by the ducted fans 287 creates a force F12 along the axis of the ducted fans 287 and is inclined upwards. At the same time, the ducted fans 287 create a strong depression on each front wing 283 and 285 which results in a force F13 perpendicular to the front wings 283 and 285. The forces F11, F12 and F13 are vectorially added and create a total lift force F14 oriented upwards, which produces the lifting of the aircraft 280 from the ground in case of take-off. The F11 force is approximately 30% larger than the F12 force that is commonly used to lift conventional VTOL aircraft. After the aircraft 280 reaches certain altitude, the ducted fans 287 located in the rear are further accelerated compared to the ones located in front, which produces the change of the pitch angle of the aircraft 280, making the transition towards the forward flight phase. The ducted fans 287 are spaced from each other and from the front wing 283 and rear wing 284, respectively from the front wing 285 and the rear wing 286 so that, in operation, the resulting air flow is amplified by the Venturi effect. The distance between two ducted fans 287 is approximately 0.15 to 0.85 of the external diameter of the ducted fan 287. The distance between each ducted fan 287 and each front wing 283 and rear wing 284 is approximately 0.15 to 0.85 of the external diameter of the ducted fan 287.

For a more precise control of the aircraft the wings can contain flaps and/or ailerons actuated by conventional mechanisms.

Any combination between the embodiments described in the invention will be considered as being part of the description and of the claims.

LIST OF REFERENCE SIGNS 1 aircraft
2 fuselage
3 frame
4 propulsion unit
5 propulsion unit
6 front wing
7 rear wing
8 jet limiter
9 front wing 10 rear wing
11 electric motor
12 tractor propeller
13 recess
14 inner cylindrical surface
15 outer cylindrical surface
16 seat
17 pilot
18 extension
19 saddle
20 cross member
21 cylindrical surface
22 joystick
23 cross member
30 windscreen
40 aircraft
60 aircraft
61 fuselage
62 frame
63 recess
64 inner cylindrical surface
65 outer cylindrical surface
66 shaft
67 cabin
68 cut
69 part
70 automatic system
71 cross member
72 cylindrical surface
73 actuator
74 pinion
75 toothed sector
76 controller
77 position sensor
78 gyroscopic platform
79 speed sensor
80 electronic control unit
81 front door
82 rear door
90 aircraft
91 cabin
92 side float
100 aircraft
101 rotating seat
102 side float
103 legs support
110 aircraft
111 fuselage
112 cabin
113 seat
114 door
120 drone
121 fuselage
122 nacelle
130 drone
131 propulsion unit
132 propulsion unit
133 front wing
134 rear wing
135 jet limiter
136 front wing
137 rear wing
138 jet limiter
139 strip
140 nacelle
150 aircraft
151 fuselage
152 propulsion unit
153 propulsion unit
154 front wing
155 rear wing
156 jet limiter
157 front wing
158 rear wing
159 bracket
160 electric motor
161 pusher propeller
162 blade
163 cabin
170 aircraft
171 fuselage
172 cabin
173 seat
174 joint
175 center of gravity
176 passenger
177 rod
180 aircraft
181 fuselage
182 frame
183 propulsion unit
184 propulsion unit
185 cabin
186 rear wing
187 front wing
188 rear wing
190 aircraft
191 fuselage
192 frame
193 propulsion unit
194 propulsion unit
195 seat
196 pilot
200 aircraft
201 fuselage
202 cabin
203 seat
204 door
205 opening
210 aircraft
211 propulsion unit
212 propulsion unit
213 front wing
214 rear wing
215 jet limiter
216 front wing
217 rear wing
218 jet limiter
219 joint
220 seat
221 joint
222 pilot
230 aircraft
231 seat
232 windscreen
240 drone
241 fuselage
242 propulsion unit
243 propulsion unit
244 storage volume
245 storage compartment
246 frame
247 storage box
248 package 249 limiter
250 clasp
260 drone
261 fuselage
262 propulsion unit
263 propulsion unit
264 semi-circular wing
265 side wing
266 support wing
267 electric motor
268 pusher propeller
280 aircraft
281 propulsion unit
282 propulsion unit
283 front wing
284 rear wing
285 front wing
286 rear wing
287 ducted fan
288 bracket
289 jet limiter
300 front seat
301 rear seat
α angle
β angle
D distance
M distance
N distance
F1 force
F2 force
F3 force
Ft lift force
F4 force
F5 force
F6 force
F7 lift force
F8 force
F9 force
F10 lift force
F11 force
F12 force
F13 force
F14 lift force
XYZ coordinate system

What is claimed is:

1. An aerial vehicle having a propulsion system for providing vertical take-offs and vertical landings comprising:
 a fuselage having a forward end and an aft end;
 a front biplane propulsion unit located at the forward end and a rear biplane propulsion unit located at the aft end, each biplane propulsion unit comprising;
  a front wing (6) and a rear wing (7) wherein both the front wing (6) and the rear wing (7) are spaced apart at a predetermined distance and are substantially parallel to each other;
  two jet limiters, each jet limiter securing a respective end of the front to the rear wing and;
  a plurality of electric motors (11) mounted on a leading edge of the rear wing (7), each electric motor (11) being configured to activate a tractor propeller, each tractor propeller (12) configured to have variable pitch, and a rotational plane of each tractor propeller (12) is located above an upper surface of the front wing at a trailing edge of the front wing (6), and the rotational plane of each tractor propeller is located at a leading edge of the rear wing and configured to blow air over an upper and lower surface of the rear wing;
 wherein, the tractor propellers are configured to generate airflow on the upper surface of the front wing to produce a lifting force which contributes to the vertical take-offs and landings.

2. The aerial vehicle of claim 1 wherein the each biplane propulsion unit (4) is configured to achieve in hover a total lift force greater than the thrust force developed by the tractor propellers (12).

3. The aerial vehicle of claim 2 wherein the fuselage (2) is in the form of a frame (3) that connects the front biplane propulsion unit with the rear biplane propulsion unit (5), and the front wing (6) and the rear wing (7) of the biplane propulsion units are fixed perpendicularly to the frame (3) in its median area, so that an angle α, formed between the wings with the horizontal plane in a static position, is between 25 degrees and 80 degrees.

4. The aerial vehicle of claim 3 wherein the aerial vehicle is an individual aircraft.

5. The aerial vehicle of claim 4 wherein in the median area, respectively in a center of gravity, the frame (3) has a recess (13) in the form of a cylindrical segment having an inner cylindrical surface (14) and an outer cylindrical surface (15), and on the inner cylindrical surface (14) a rotating seat (16) is located for a pilot (17), the rotating seat (16) having a semi-cylindrical shape, and the rotating seat (16) together with the pilot (17) are configured to be actuated in rotational motion with an angle established by an automatic system which considers the flight regime, so that an initial vertical position of the pilot (17) is maintained in all flight regimes, and the rotating seat (16) has two extensions (18), as support for the pilot's legs, located on both sides of the frame (3), and the rotating seat (16) has a saddle (19) for the pilot to sit on, and a cross member (20) is attached between the two extensions (18), having a cylindrical surface (21) for sliding on the outer cylindrical surface (15) of the recess (13) and keeps in all flight regimes the rotating seat (16) attached in the recess (13), and on the rotating seat (16) are mounted two joysticks (22), which serve for the control of the aerial vehicle.

6. The aerial vehicle of claim 5 wherein the aerial vehicle is of amphibious type, having two side floats (102) symmetrically located on either side of the seat (101), attached from two leg supports (103), respectively on a lower side, and the floats (102) have an elongated aerodynamic shape.

7. The aerial vehicle of claim 5 wherein the aerial vehicle has a windscreen (30), fixed to the seat (16), having the role of protection, against frontal air flow, for the pilot (17).

8. The aerial vehicle of claim 3 wherein the fuselage contains a cabin (112), having an aerodynamic shape, and inside the cabin (112) is mounted a seat (113), and the cabin (112) has two access doors (114), one of them being for emergency cases, and the seat (113) is inclined rearwards so that when the aircraft (110) is in forward flight, the pilot's position is substantially vertical.

9. The aerial vehicle of claim 3 wherein the aerial vehicle is configured to carry several persons.

10. The aerial vehicle of claim 9 wherein the frame (62) has a recess (63) in the form of a cylindrical segment having an inner cylindrical surface (64) and an outer cylindrical surface (65), and on the inner cylindrical surface (64) is a rotatable shaft (66), integrated with a cabin (67), for pilot, passengers and payloads, and access inside the cabin (67) is achieved by two front doors (81) and two rear doors (82), placed side by side and symmetrically on the cabin (67), and the front doors (81) allow the access to front seats (300), and the doors (82) allow the access to rear seats (301), and the rotatable shaft (66) is mounted in the middle area, respectively in the center of gravity of the cabin (67), and the cabin (67) has a flat aerodynamic shape, and is mounted symmetrically on the frame (62), being positioned in the middle area, and at the rear, in the median area, the cabin (67) has a cut (68), which splits the cabin (67) in two parts (69), and the cabin (67) is configured to be actuated in rotational motion by an automatic system (70) which takes into account the flight regime, and between the two parts (69) is fixed a cross member (71) having a cylindrical surface (72) for sliding slides on the outer cylindrical surface (65) of the recess (63) and keeps the cabin (67), in all situations, in contact with the recess (63), and during take-off and landing the automatic system (70) is configured to regulate the position of the cabin (67) to remain constantly horizontal during the transition and during the forward flight period.

11. The aerial vehicle of claim 10 wherein the automatic system (70) is configured to control rotation of the cabin (67) with respect to the frame (62) by the help of an actuator (73) which acts by means of a pinion (74) a toothed sector (75), the toothed sector (75) being integrated with the shaft (66) and with the cabin (67).

12. The aerial vehicle of claim 11 wherein a controller (76) is configured to control the actuator (73) based on inputs received from a group of sensors including:
a position sensor (77) of the cabin (67) which perceives the position relative to the frame (62),
a gyroscopic platform (78) that perceives the position of the cabin (67) in space and
a speed sensor (79) that transmits the horizontally speed of the aircraft (60), and the controller (76) being connected with an electronic control unit (80) configured to simultaneously regulate the stability, the direction and the speed of the aerial vehicle.

13. The aerial vehicle of claim 3 wherein the aerial vehicle is a drone (120), and in the middle area the fuselage (121) contains a nacelle (122), having an aerodynamic shape, aligned with the front and rear wings of the biplane propulsion units.

14. An aerial vehicle having a propulsion system for providing vertical take-offs and vertical landings comprising:
a fuselage having a forward end and an aft end;
a front biplane propulsion unit located at the forward end and a rear biplane propulsion unit located at the aft end, each biplane propulsion unit comprising;
a front wing (6) and a rear wing (7) wherein both the front wing (6) and the rear wing (7) are spaced apart at a predetermined distance and are substantially parallel to each other;
two jet limiters, each jet limiter securing a respective end of the front to the rear wing;
a plurality of electric motors (160) mounted on an upper surface of the front wing, by several bracket (159), the electric motors (160) being located at equal distances from each other; and
each electric motor (160) configured to actuate a pusher propeller (161), which has several blades (162), and the rotational plane of the pusher propellers (161) is located over the upper surface of the front wing (154) at the trailing edge of the front wing (154), and the rotational plane of the pusher propellers (161) is located under a lower surface of the rear wing (155) and at the leading edge of the rear wing (155), and the rotational plane of the pusher propellers (161) makes an angle β between 80 and 140 degrees with the front wing (154); and
wherein the air flow generated by the pusher propellers (161) on the upper surface of the front wing (154) and on the lower surface of the rear wing (155) produces a lifting force which contributes to the vertical take-offs and landings.

15. The aerial vehicle of the claim 14 wherein the propulsion unit (152) is configured to achieve a total lift force greater than the thrust force developed by the pusher propellers (161) in a hover phase.

16. The aerial vehicle of the claim 14 wherein each pusher propeller (161) having several blades (162), which are of pivoting type, and the blades are aligned with a longitudinal axis of the electric motors (160) when the pusher propeller (161) are not operated.

17. The aerial vehicle of claim 16 wherein the front wing (154) is mounted perpendicular to the fuselage (151) in its median area, so that an angle α formed with a horizontal plane is between 25 and 80 degrees, and the four jet limiters (156) serve as landing gear for contact with the ground surface of the aircraft (150).

18. The aerial vehicle of claim 17 wherein the aerial vehicle is an individual aircraft.

19. The aerial vehicle of claim 16 wherein fuselage (201) forms a cabin (202) that connects the front and rear biplane propulsion units, and the cabin (202) contains two seats (203), for two passengers, and the cabin (202) has two access doors (204), and the position of each seat (203) is configured to be adjusted by an actuator in relation with flying phases of the aircraft; wherein the fuselage (201) presents in the front an opening (205), having a trapezoidal shape, that permits free circulation of the air flow through the pusher propellers (161).

20. The aerial vehicle of claim 16 wherein the fuselage (171) contains a cabin (172), having an aerodynamic shape that contains at least two seats (173), placed on rows, and each seat (173) is secured by two joints (174), located above center of gravity (175) of the seat (173), and the two seats (173) are rotatably connected by a rod (177) to maintain the passengers (176) in a comfortable and normal position during flying phases.

21. The aerial vehicle of claim 16 wherein substantially in the center of gravity of the aerial vehicle a rotatable cabin (185) is mounted, and the rear wing of the front biplane propulsion unit (183) smaller than the front wing (187), and the rear wing of the rear biplane propulsion unit is smaller than the front wing (189), and the cabin (185) is configured to remain in horizontal position in all the flight phases.

22. The aerial vehicle of claim 16 wherein substantially in the center of gravity of the aerial vehicle (190) a rotatable seat (195) is mounted for a pilot (196).

* * * * *